US010628576B1

(12) United States Patent
Haq et al.

(10) Patent No.: US 10,628,576 B1
(45) Date of Patent: Apr. 21, 2020

(54) COMPUTER-BASED PLATFORMS OR SYSTEMS, COMPUTING DEVICES OR COMPONENTS AND/OR COMPUTING METHODS FOR TECHNOLOGICAL APPLICATIONS INVOLVING PROVISION OF A PORTAL FOR MANAGING USER ACCOUNTS HAVING A LOGIN PORTAL CONFIGURED TO DEFEND AGAINST CREDENTIAL REPLAY ATTACKS

(71) Applicant: Capital One Services, LLC, McLean, VA (US)

(72) Inventors: Salman Haq, Herndon, VA (US); Jit Sen, Frisco, TX (US); Sreedhar Vedantam, Plano, TX (US); Riteshkumar Hadawani, McKinney, TX (US)

(73) Assignee: Capital One Services, LLC, McLean, VA (US)

( * ) Notice: Subject to any disclaimer, the term of this patent is extended or adjusted under 35 U.S.C. 154(b) by 0 days.

(21) Appl. No.: 16/545,835

(22) Filed: Aug. 20, 2019

(51) Int. Cl.
*G06F 21/00* (2013.01)
*G06F 21/44* (2013.01)
*G06F 21/55* (2013.01)

(52) U.S. Cl.
CPC ............ *G06F 21/44* (2013.01); *G06F 21/554* (2013.01); *G06F 2221/034* (2013.01)

(58) Field of Classification Search
CPC ... G06F 21/44; G06F 21/554; G06F 2221/034
See application file for complete search history.

(56) References Cited

U.S. PATENT DOCUMENTS

| 8,312,520 | B2 | 11/2012 | Baumhof |
| 8,418,235 | B2 | 4/2013 | Sherkin et al. |
| 8,649,509 | B2 | 2/2014 | Asher |
| 8,769,637 | B2 | 7/2014 | Janzen |
| 8,966,276 | B2 | 2/2015 | Nanopoulos et al. |
| 9,059,989 | B2 | 6/2015 | Kurkure |
| 2005/0216582 | A1* | 9/2005 | Toomey .................. G06F 21/41 709/224 |
| 2014/0020073 | A1* | 1/2014 | Ronda ..................... G06F 21/31 726/7 |

* cited by examiner

*Primary Examiner* — Beemnet W Dada
(74) *Attorney, Agent, or Firm* — Greenberg Traurig, LLP

(57) ABSTRACT

Systems and methods associated with computer-implemented online portals having secure login processing features are disclosed. In one embodiment, an exemplary method may comprise receiving a login request including processing user credentials and capturing browser print information associated with the login request, validating the login request via analyzing current login attributes and/or an attributes checksum derived from the browser print information captured during the login request and assessing the browser print information for spoofed browser attributes, redirecting an access attempt that is flagged as the potential replay attack to an enhanced security process, and allowing or denying login to customer accounts or information associated with the user credentials based on the enhanced security process.

20 Claims, 20 Drawing Sheets

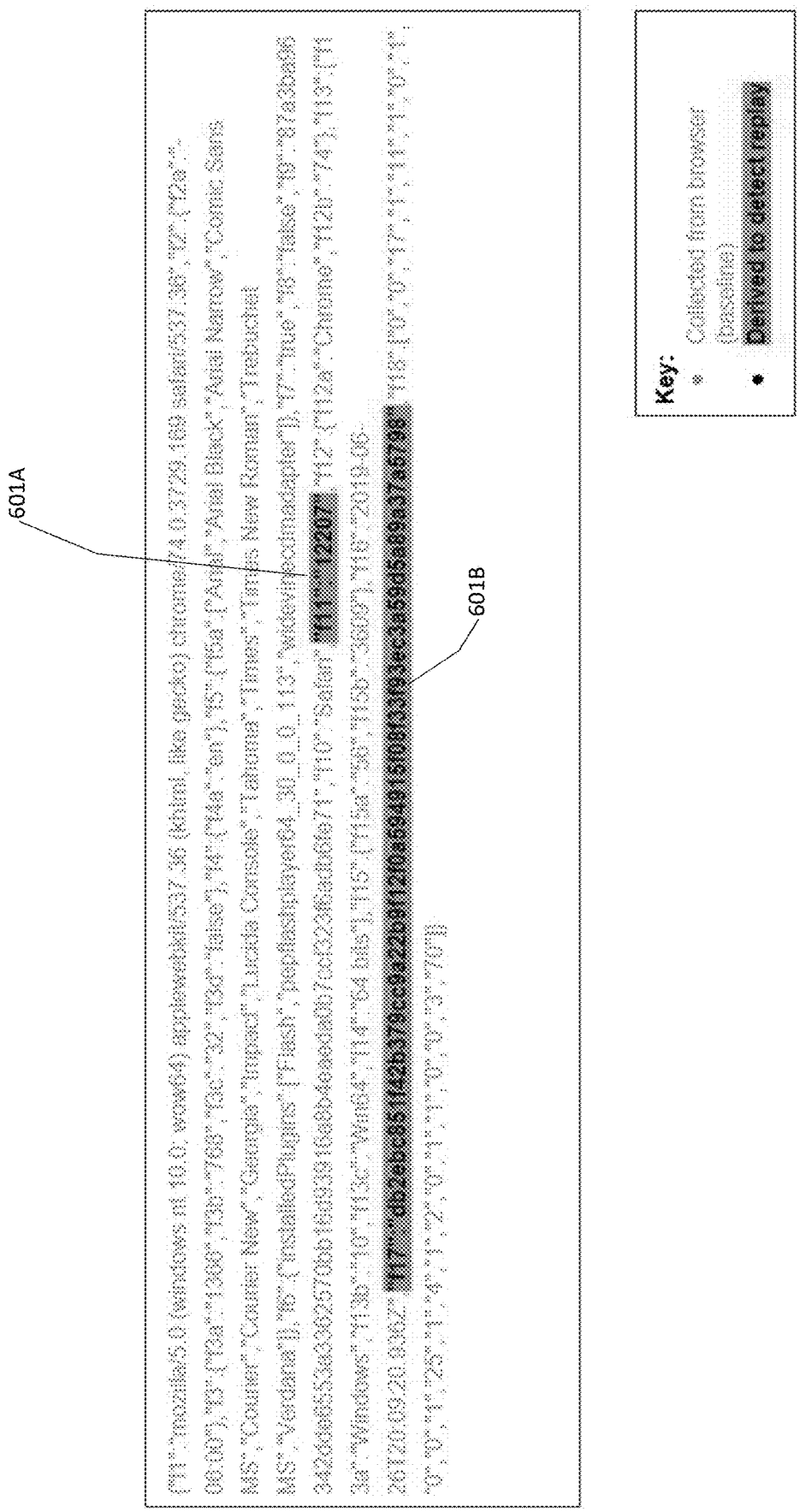

| Operation | Example 1 | Example 2 | Example 3 |
|---|---|---|---|
| {"f1":"mozilla/5.0 (macintosh; intel mac os x 10_14_5) applewebkit/537.36 (khtml, like gecko) chrome/75.0.3770.100 safari/537.36","f2":{"f2a":"US","f2b":{"f2a":"US","f2b":"en-US"},"f2c":"MacIntel","f2d":"true"},"f2e":{"f5a":"en-US"},"f6":{"installedFonts":["Arial Black","Arial Narrow","Courier","Courier New","Papyrus","Tahoma","Trebuchet MS"]},"f7":{"f7a":"internal-nacl-plugin","f7b":"internal-pdf-viewer","mojtwdgcjkbpmeopjchoegfgjshlai"},"f8":"true","f9":"false","f9":"false","f10":{"f10a":"00","f10b":"Safari","f10c":"","f11":3389},"f12":{"f12a":"","Chrome","f12b":"","f13":{"f13a":"","f13b":"Mac OS X","f14a":"10.14.5","f15":"Macintel"},"f16":"","f17":{"f17a":"US","f18":20},"f19":"no","f20":"0.0","f20b":"2008-003-0812-23-47 8789","f21":"9e319c7fc329dbf3a74f7286f89e4b156ee0%a748eee823186eeb5b3ab58948f6c68f9680568","f22":{"f22a":"0","f22b":"0","f22c":"0","f22d":"0","f22e":"0","f22f":"0","f22g":"0","f22h":"0","f22i":"0","f22j":"0","f22k":"0","f22l":"0"},"z1":"} | | |
| 1 | Time-varying value from the browser | 2019-07-08T17:45:57.230Z | 2019-07-08T17:50:10.333Z | 2019-07-08T17:47:27.992Z |
| 2 | Convert timestamp to a mathematical expression<br>for example: convert timestamp to mathematical expression using some formula | 2119+17+306+45+57+231 | 2119+17+306+51+11+333 | 2119+17+306+47+27+992 |
| 3 | exp1 = result of expression generated in last step (2) | 2775 | 2837 | 3508 |
| 4 | exp2 = generate next expression based on result of exp1<br>for example:<br>if exp1 is odd ){<br>  exp2 = exp1 '+' (multiplication of each digit of the exp1)<br>} else {<br>  exp2 = exp1<br>} | 2775 + (2*7*7*5) = 3265 | 2837+(2*8*3*7) = 3173 | 3508 = 3508 |
| 5 | Timestamp Checksum Number<br>Add as a field in devicepint | 3265<br>"z1":"3389" | 3173<br>"z1":"3389" | 3508<br>"z1":"3389" |

FIG. 6C

| Operation | Example 1 | Example 2 | Example 3 |
|---|---|---|---|
| 1 | JSON_STRING = get the json string from the deviceprint of the selected fields to be included in the checksum | {"f1":"mozilla/5.0 (macintosh; intel mac os x 10_14_5) applewebkit/537.36 (khtml, like gecko) chrome/75.0.3770.100 safari/537.36","f2":{"f2a":"-06:00"},"f3":{"f3a":"1920","f3b":"1280","f3c":"24","f3d":true},"f4":{"f4a":"en-US"},"f5":{"f5a":["Arial Black","Arial Narrow","Courier","Courier New","Papyrus","Tahoma","Trebuchet MS"]},"f6":{"f6a":["internal-pdf-viewer","internal-nacl-plugin","mkj1hmdqofcjbbpmsojofohosfqtesjai"]},"f7":true,"f8":false,"f9":"7dc3d1a827a538443778dbb164741969fbfdca1f6d2085a5af9734547477a28","f10":"Safari"} | |
| 2 | Generate SHA-256 checksum for JSON_STRING | SHA-256(JSON_STRING) = 9e517e7fb22941bf3a7d7fb98d045106e09c744ae8216dea5b2b40c8999d5905 | |
| 3 | Add the generated checksum in the deviceprint as one of the field | see checksum field in the deviceprint "f17":"9e517e7fb22941bf3a7d7fb98d045106e09c744ae8216dea5b2b40c8999d5905" | |

FIG. 6D

| Check | Reason for treating as risk of a replay attack |
|---|---|
| 1 | Timestamp is more than X seconds old | Request contains stale data |
| 2 | "f11" attribute is missing | Request is missing expected attribute |
| 3 | "f17" attribute is missing | Request is missing expected attribute |
| 5 | Re-computed and received "f11" values do not match | Request does not have expected value |
| 6 | Re-computed and received "f17" values do not match | Request does not have expected value |

COMPUTER-BASED PLATFORMS OR SYSTEMS, COMPUTING DEVICES OR COMPONENTS AND/OR COMPUTING METHODS FOR TECHNOLOGICAL APPLICATIONS INVOLVING PROVISION OF A PORTAL FOR MANAGING USER ACCOUNTS HAVING A LOGIN PORTAL CONFIGURED TO DEFEND AGAINST CREDENTIAL REPLAY ATTACKS

FIELD OF TECHNOLOGY

The present disclosure generally relates to an improved computer-based platform or system, improved computing components and devices and/or improved computing methods configured for one or more novel technological applications involving a login portal comprising features and functionality that detect and/or reduce credential replay attacks at login.

BACKGROUND OF TECHNOLOGY

A computer network platform/system may include a group of computers (e.g., clients, servers, smart routers, etc.) and other computing hardware devices that are linked together through one or more communication channels to facilitate communication, secure account management and/or electronic transactions.

SUMMARY OF DESCRIBED SUBJECT MATTER

In some embodiments, the present disclosure provides various exemplary technically improved computer-implemented methods for improving login security, including a method having steps such as:

processing, by the at least one processor, a login request, including receiving user credentials and browser print information associated with the login request, the browser print information comprising current login attributes, a timestamp and/or an attributes checksum;

validating the login request, including analyzing one or both of the current login attributes and the attributes checksum derived from the browser print information captured during the login request, wherein the analyzing comprises assessing the browser print information for spoofed browser attributes including:

determining whether a captured timestamp of the current login data is stale or missing;

determining whether the attributes checksum of the login request is invalid or missing; and flagging the login request as a potential replay attack when at least one of the captured timestamp is stale, and the captured timestamp is missing, the attributes checksum is invalid, and the attributes checksum is missing;

redirecting an access attempt that is flagged as the potential replay attack to an enhanced security process, wherein the enhanced security process includes generating and sending second factor authentication; and/or allowing or denying login to customer accounts or information associated with the user credentials based on the enhanced security process.

In some embodiments, the present disclosure also provides exemplary technically improved computer-based systems and computer-readable media, including media implemented with and/or involving one or more software applications, whether resident on computer devices or platforms, provided for download via a server and/or executed in connection with at least one network such as via a web browser application, that include or involves features, functionality, computing components and/or steps consistent with those set forth herein.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

FIGS. 6A-6K are diagrams illustrating various features and functionality associated with detecting and reducing browser replay attacks, consistent with exemplary aspects of certain embodiments of the present disclosure.

DETAILED DESCRIPTION

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

Figure 1:
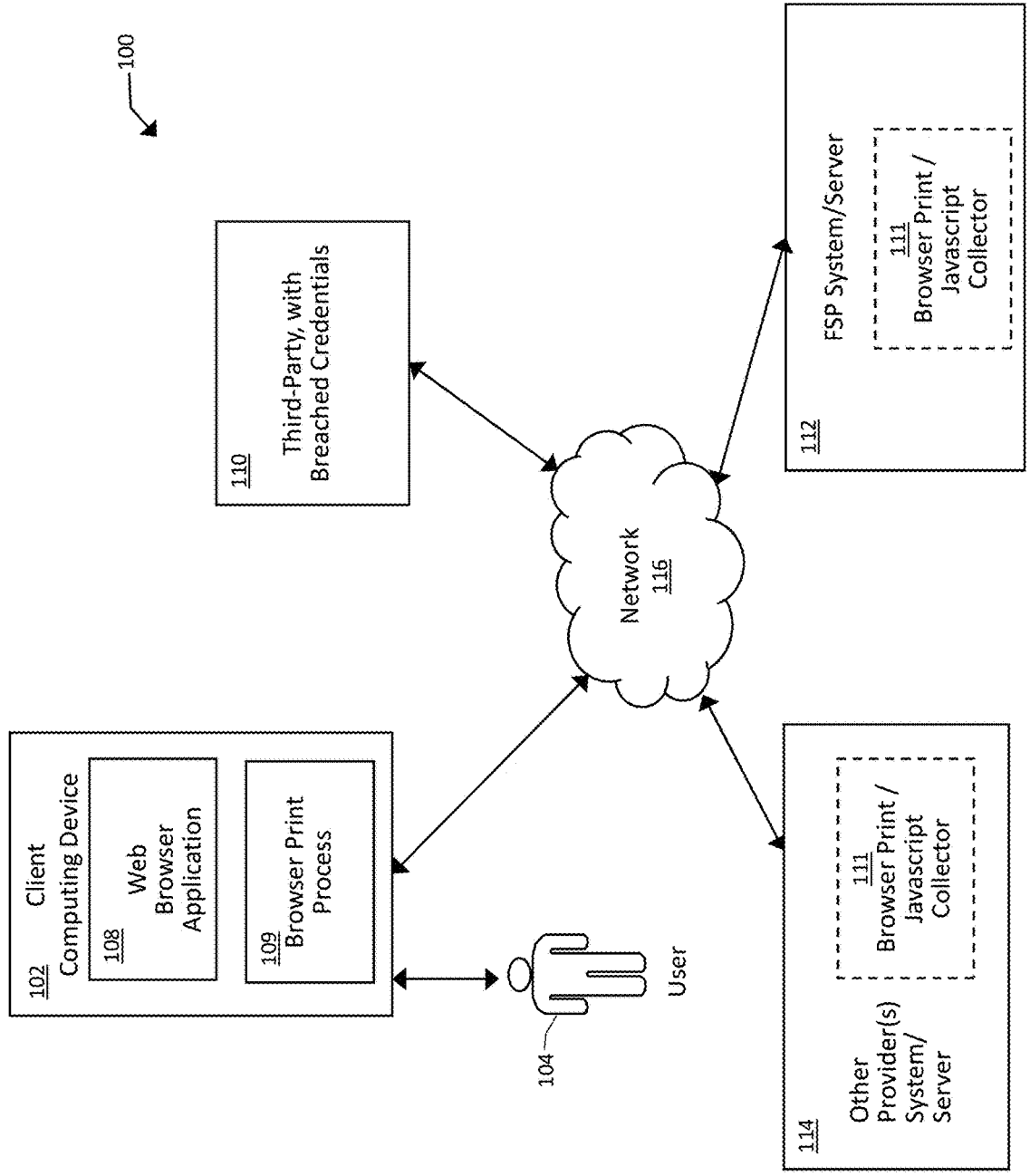
FIG. 1 is a block diagram of an exemplary system and/or platform involving features of detecting and/or reducing browser replay attacks, consistent with exemplary aspects of certain embodiments of the present disclosure.

FIG. 1 is a block diagram of an exemplary system and/or platform 100 involving features of detecting and/or reducing browser replay attacks, consistent with disclosed embodiments. System 100 may be configured for executing one or more software applications having web browser and/or browser print processes consistent with disclosed embodiments. As shown, system 100 may include a computing device 102, such as a client computing device, associated with a user 104. Computing device 102 may be configured to execute, among other programs, a web browser application 108 and a browser print process 109. System 100 may further include a third party computer or system 110 such as an entity attempting to fraudulently use breached credentials via browser reply attack, a financial service provider (FSP) system 112, and various other providers or entities 114, such as merchants and other providers that have online user accounts, that wish to maintain the security of their customer or user accounts. As shown, computing device 102, third party 110, FSP system 112, and other provider(s) 114 may be communicatively coupled by a network 116. Various functionality and benefits of web browser application 108 and browser print process 109 may also be achieved via one or more modules 111 within, or more directly associated with, a FSP system 112 and/or an other provider system 114, for example, such as one or more browser print and/or Javascript collector modules 111. For simplicity of explanation, the behavior of the behavior of such computer systems and/or components (i.e., 108, 109 and 111) are generally discussed below by referring to to just web browser applications or systems.

While only one computing device 102, web browser application 108, module 111, FSP system 112, other provider(s) system 114, and network 116 are shown, it will be understood that system 100 may include more than one of any of these components. More generally, the components and arrangement of the components included in system 100 may vary. Thus, system 100 may include other components that perform or assist in the performance of one or more processes consistent with the disclosed embodiments. Computing device 102 may be one or more computing devices configured to perform operations consistent with executing web browser application 108 and browser print process 109. One illustrative computing device 102 is further described below in connection with FIG. 3.

Web browser application 108 may be one or more software applications configured to perform operations consistent with providing web pages to the user, accessing online accounts, as set forth herein, as well as searching and obtaining desired information from web pages, and the like. Here, for example, web browser application 108 may be configured to provide various information, such as browser print information, associated with accessing and/or logging-into websites related to the user's 104 online activity. Such processing may occur by or with a web browser application 108, locally, or the web browser application 108 may transmit requests to and/or operate with one or more other software applications and/or computing components to search for and obtain the desired information. Web browser application 108 may also be hosted and/or operated, in whole or in part, by a web browser system and/or server, described below in connection with FIG. 2. Web browser application 108 is further described below in connection with FIG. 3.

Browser print process or application 109 may be one or more software applications, modules, routines, subroutines and/or extensions configured to perform operations consistent with providing browser print information, such as browser attributes shown and discussed further in connection with FIGS. 6A-6K, with FSP or other provider systems.

Third party 110 may be an entity associated with one or more computing devices that are being operated, by a fraudster, to perform operations involving fraudulently logging-into customer accounts established, e.g., by FSPs, merchants and other providers over a network such as the web. Here, for example, fraudsters often acquire batches of breached credentials and then check their validity of FSP and/or other provider(s) websites by simulating logins with those credentials. Further, such fraudulent login attempts may include browser replay attacks that also simulate faux web browser attributes as well as timestamp and/or other security values that are commonly used to prevent such fraudulent logins.

FSP system 112 may be associated with a financial service entity that provides, maintains, manages, or otherwise offers financial services. For example, the financial service entity may be a bank, credit card issuer, or any other type of financial service entity that generates, provides, manages, and/or maintains financial service accounts for one or more customers. Financial service accounts may include, for example, credit card accounts, loan accounts, checking accounts, savings accounts, reward or loyalty program accounts, and/or any other type of financial service account known to those skilled in the art.

FSP system 112 may be one or more computing devices configured to perform operations consistent with servicing or maintaining financial service accounts, including a financial service account associated with user 104. FSP system 112 may be further configured to process financial transactions associated with such financial service accounts, including authenticating and performing fraud detection regarding such transactions. In particular, FSP system 112 may be configured to perform such processing of financial transactions associated with a financial service account associated with user 104. In some embodiments, FSP system 112 may be further configured to generate content for a display device included in, or connected to, computing device 102, such as through a desktop or mobile banking or other application on computing device 102. Alternatively or additionally, FSP system 112 may be configured to provide content through one or more web pages or online portals that are accessible by computing device 102 over network 116. The disclosed embodiments are not limited to any particular configuration of FSP system 112.

Other provider system 114 may be one or more computing devices configured to perform operations consistent with providing web pages that are accessible by computing device 102 over network 116. For example, the web pages may be provided at computing device 102 through web browser application 108. In some embodiments, other provider system 114 may be associated with a merchant that provides goods or services, other service providers, or other entities that provide online customer or user accounts. Further, in some embodiments, the web pages may include online login pages through which user 104 may engage, in connection with accessing their account. Other web pages are possible as well. The disclosed embodiments are not limited to any particular configuration of other provider system 114.

In some embodiments, FSP system 112 and/or other provider system 114 may include one or more modules configured for browser print functionality and/or collection of browser attributes from web browser interactions, such as via a Javascript collector. According to certain embodiments, other provider system 114 may be provided in connection with one or more financial service providers, such as the financial service provider associated with FSP system 112 or another financial service provider, such as may be involved with providing financial-related services.

Network 116 may be any type of network configured to provide communication between components of system 100. For example, network 116 may be any type of network (including infrastructure) that provides communications, exchanges information, and/or facilitates the exchange of information, such as the Internet, a Local Area Network, near field communication (NFC), optical code scanner, or other suitable connection(s) that enables the sending and receiving of information between the components of system 100. In other embodiments, one or more components of system 100 may communicate directly through a dedicated communication link(s).

It is to be understood that the configuration and boundaries of the functional building blocks of system 100 have been defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Figure 2:
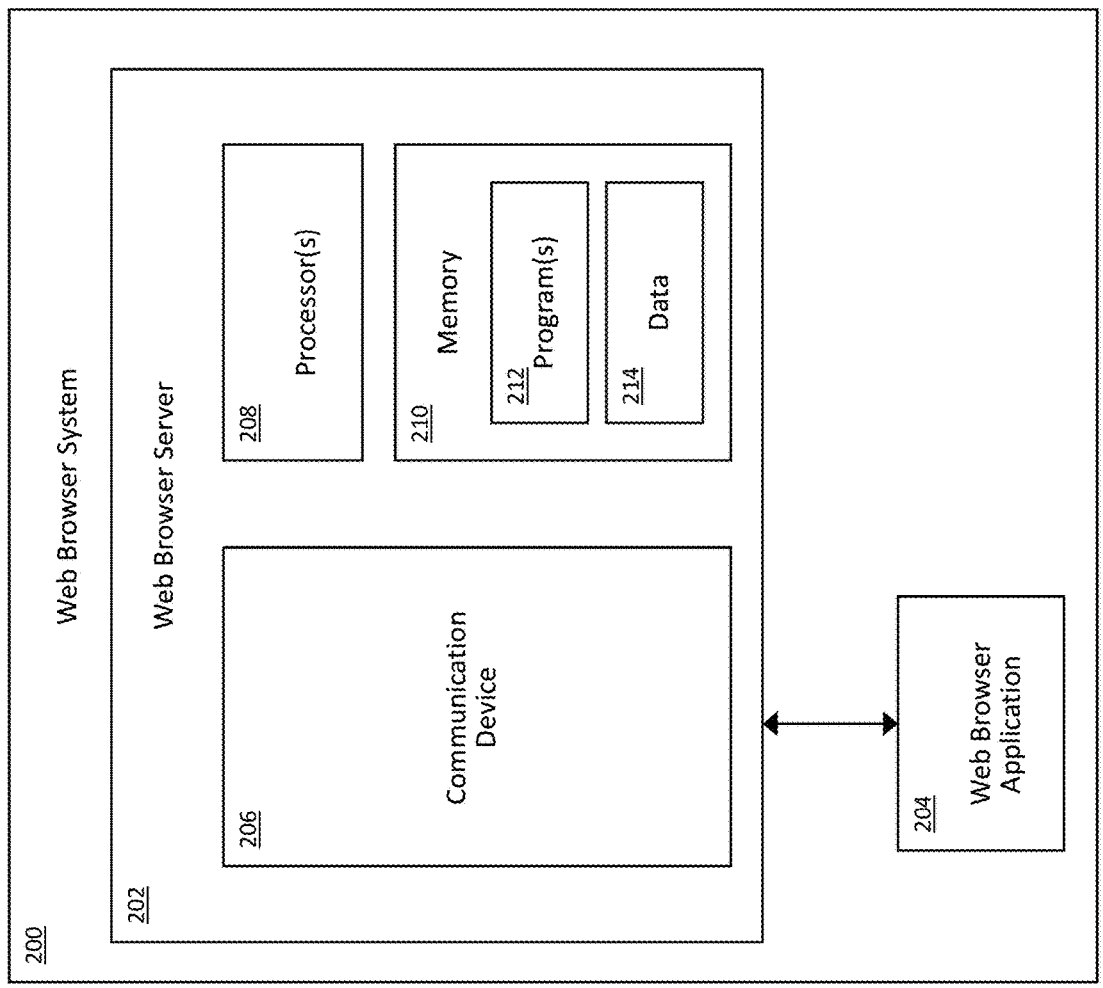
FIG. 2 is a block diagram of an exemplary system and/or platform involving features of detecting and/or reducing browser replay attacks, consistent with exemplary aspects of certain embodiments of the present disclosure.

FIG. 2 is a block diagram of an exemplary web browser system 200, consistent with disclosed embodiments. As shown, web browser system 200 may include web browser server 202 and web browser application 204. Web browser server 202 may include a communication device 206, one or more processor(s) 208, and memory 210 including one or more programs 212 and data 214. Web browser server 202 may be configured to perform operations consistent with providing web browser application 204.

Web browser server 202 may take the form of a server, general purpose computer, mainframe computer, or any combination of these components. Other implementations consistent with disclosed embodiments are possible as well. Web browser application 204 may take the form of one or more software applications stored on a computing device, such as web browser application 108 stored on computing device 102 described above.

Communication device 206 may be configured to communicate with one or more computing devices, such as computing device 102. In some embodiments, communication device 206 may be configured to communicate with the computing device(s) through web browser application 204. Web browser server 202 may, for example, be configured to provide instructions and/or operating information to web browser application 204 through communication device 206. Communication device 206 may be configured to communicate other information as well.

Communication device 206 may be further configured to communicate with one or more FSP systems, such as FSP system 112 described above, and/or with other providers, such as other provider 114 described above. In some embodiments, the FSP system may provide a financial service account associated with a computing device, and communication device 206 may be configured to communicate with the FSP system(s) to generate, transmit and/or process security-related information or instructions regarding the financial service account associated with the computing device. Communication device 206 may be configured to communicate with the FSP system(s) in other manners. Communication device 206 may be configured to communicate with other components as well.

Processor(s) 208 may include one or more known processing devices, such as a microprocessor from the Core™, Pentium™ or Xeon™ family manufactured by Intel®, the Turion™ family manufactured by AMD™, the "Ax" (i.e., A6 or A8 processors) or "Sx" (i.e. S1, . . . processors) family manufactured by Apple™, or any of various processors manufactured by Sun Microsystems, for example. The disclosed embodiments are not limited to any type of processor(s) otherwise configured to meet the computing demands required of different components of browser extension system 200.

Memory 210 may include one or more storage devices configured to store instructions used by processor(s) 208 to perform functions related to disclosed embodiments. For example, memory 210 may be configured with one or more software instructions, such as program(s) 212, that may perform one or more operations when executed by processor(s) 208. Such operations may include web browsing activities as well as creation and/or transmission of related web/browser attribute information, such as captured via browser print operation(s). The disclosed embodiments are not limited to separate programs or computers configured to perform dedicated tasks. For example, memory 210 may include a single program 212 that performs the functions of web browser system 200, or program(s) 212 may comprise multiple programs. Memory 210 may also store data 214 that is used by program(s) 212.

In certain embodiments, memory 210 may store one or more sets of instructions involved with carrying out the processes described below in connection with FIG. 4. Other instructions are possible as well. In general, instructions may be executed by processor(s) 208 to perform one or more processes consistent with disclosed embodiments. In some embodiments, program(s) 212 may include one or more subcomponents configured to generate and/or process instructions and information for use by web browser application 204 in performing login and other activities associated with accessing online accounts.

The components of web browser system 200 may be implemented in hardware, software, or a combination of both hardware and software, as will be apparent to those skilled in the art. For example, although one or more components of web browser system 200 may be implemented as computer processing instructions, all or a portion of the functionality of web browser system 200 may be implemented instead in dedicated electronics hardware. In some embodiments, web browser system 200 may also be communicatively connected to one or more database(s) (not shown). Alternatively, such database(s) may be located remotely from web browser system 200. Web browser system 200 may be communicatively connected to such database(s) through a network, such as network 116 described above. Such database(s) may include one or more memory devices that store information and are accessed and/or managed through web browser system 200. By way of example, such database(s) may include Oracle™ databases, Sybase™ databases, or other relational databases or non-relational databases, such as Hadoop sequence files, HBase, or Cassandra. Such database(s) may include computing components (e.g., database management system, database server, etc.) configured to receive and process requests for data stored in memory devices of the database(s) and to provide data to the database(s).

Figure 3:
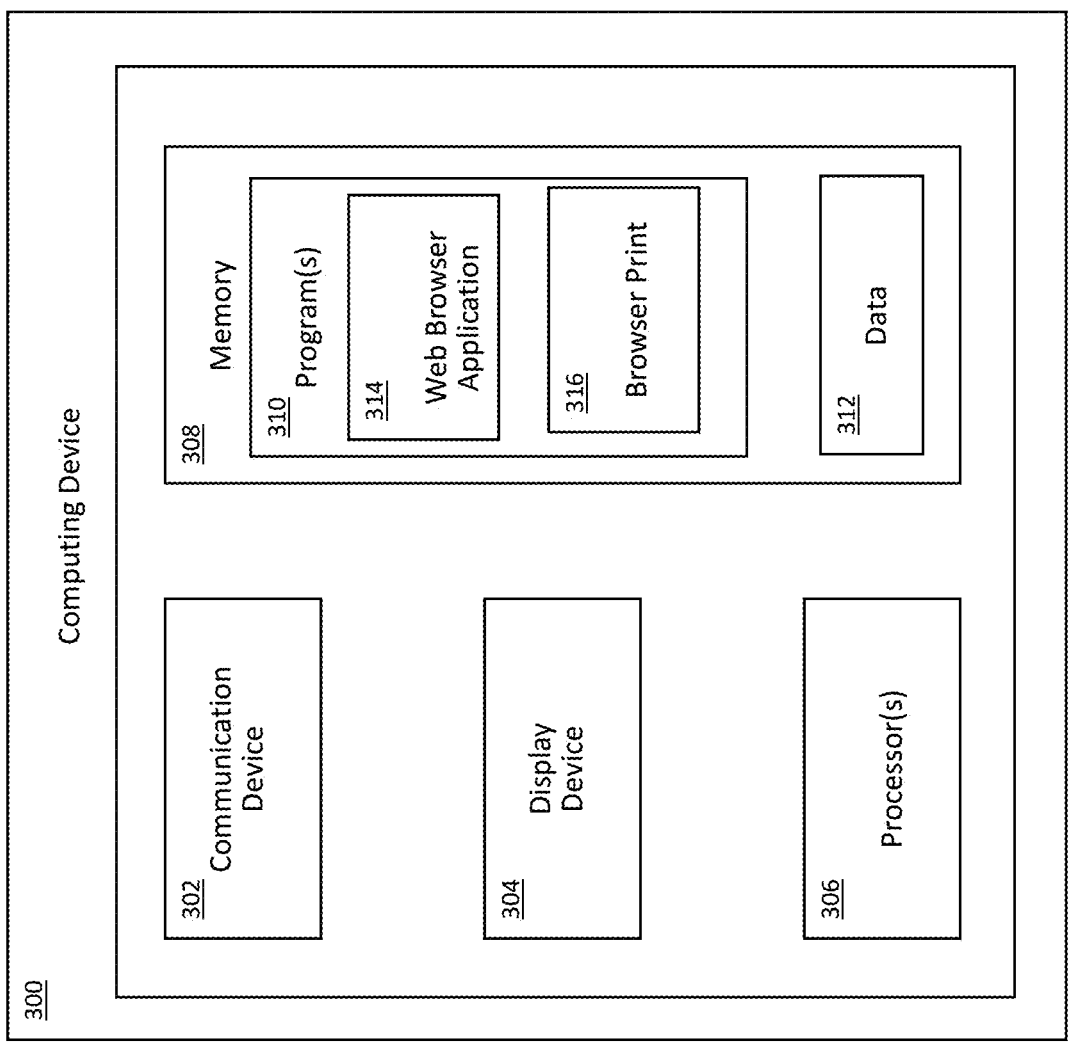
FIG. 3 is a block diagram of an exemplary computing device that may be associated with detecting and/or reducing browser replay attacks, consistent with exemplary aspects of certain embodiments of the present disclosure.

FIG. 3 is a block diagram of an exemplary computing device 300, consistent with disclosed embodiments. As shown, computing device 300 may include communication device 302, display device 304, processor(s) 306, and memory 308 including program(s) 310 and data 312. Program(s) 310 may include, among others, web browser application 314 and browser print application 316. In some embodiments, computing device 300 may take the form of a desktop or mobile computing device, such as a desktop computer, laptop computer, smartphone, tablet, or any combination of these components. Alternatively, computing device 300 may be configured as any wearable item, including jewelry, smart glasses, or any other device suitable for carrying or wearing on a user's person. Other implementations consistent with disclosed embodiments are possible as well. Computing device 300 may, for example, be the same as or similar to computing device 102 described above.

In the example embodiment shown, communication device 302 may be configured to communicate via one or more networks with the various computer systems and servers disclosed elsewhere herein. In some embodiments, communication device 302 may be further configured to communicate with one or more other providers, such as other provider system 114 described above, and/or one or more FSP systems, such as FSP system 112 described above. Communication device 302 may be configured to communicate with other components as well. Communication device 302 may be configured to provide communication over a network, such as network 116 described above. To this end, communication device 302 may include, for example, one or more digital and/or analog devices that allow computing device 300 to communicate with and/or detect other components, such as a network controller and/or wireless adaptor for communicating over the Internet. Other implementations consistent with disclosed embodiments are possible as well.

Display device 304 may be any display device configured to display interfaces on computing device 300. The interfaces may include, for example, web pages provided by computing device 300 through web browser application 108. In some embodiments, display device 304 may include a screen for displaying a graphical and/or text-based user interface, including but not limited to, liquid crystal displays (LCD), light emitting diode (LED) screens, organic light emitting diode (OLED) screens, and other known display devices. In some embodiments, display device 304 may also include one or more digital and/or analog devices that allow a user to interact with computing device 300, such as a touch-sensitive area, keyboard, buttons, or microphones. Other display devices are possible as well. The disclosed embodiments are not limited to any type of display devices otherwise configured to display interfaces.

Processor(s) 306 may include one or more known processing devices, such as a microprocessor from the Core™, Pentium™ or Xeon™ family manufactured by Intel™, the Turion™ family manufactured by AMD™, the "Ax" or "Sx" family manufactured by Apple™, or any of various processors manufactured by Sun Microsystems, for example. Processor(s) 306 may also include various architectures (e.g., x86 processor, ARM®, etc.). The disclosed embodiments are not limited to any type of processor(s) otherwise configured to meet the computing demands required of different components of computing device 300.

Memory 308 may include one or more storage devices configured to store instructions used by processor(s) 306 to perform functions related to disclosed embodiments. For example, memory 308 may be configured with one or more software instructions, such as program(s) 310, that may perform one or more operations when executed by processor(s) 306. The disclosed embodiments are not limited to separate programs or computers configured to perform dedicated tasks. For example, memory 308 may include a single program 310 that performs the functions of computing device 300, or program(s) 310 may comprise multiple programs. Memory 308 may also store data 312 that is used by program(s) 310. In certain embodiments, memory 308 may store sets of instructions for carrying out some processes performed in connection with FIG. 4. Other instructions are possible as well. In general, instructions may be executed by processor(s) 306 to perform one or more processes consistent with disclosed embodiments.

In some embodiments, program(s) 310 may include a web browser application 314. Web browser application 314 may be executable by processor(s) 306 to perform operations including, for example, providing web pages, including login pages, for display. The web pages may be provided, for example, via display device 304. In some embodiments, the web pages may be associated with systems, such as FSP system 112, other provider system 114, and the like, described above. Web browser application 314 may be executable by processor(s) 306 to perform other operations as well. In some embodiments, program(s) 310 may further include a browser print application 316. Browser print application 316 may, for example, be the same as similar to browser print application 109 described above. Browser print application 316 may be executable by processor(s) 306 to perform various operations including, for example, storing and/or providing static information (attributes, etc.) associated with web pages accessed by computing device 300 via web browser application 314. Other instructions are possible as well. In general, instructions may be executed by processor(s) 306 to perform one or more processes consistent with disclosed embodiments.

The components of computing device 300 may be implemented in hardware, software, or a combination of both hardware and software, as will be apparent to those skilled in the art. For example, although one or more components of computing device 300 may be implemented as computer processing instructions, all or a portion of the functionality of computing device 300 may be implemented instead in dedicated electronics hardware.

Figure 4:
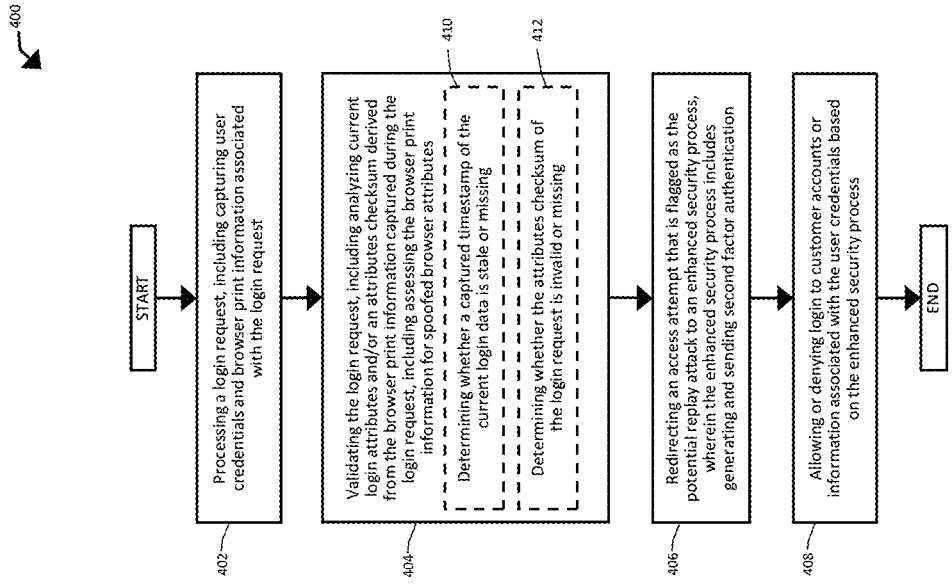
FIG. 4 is a flowchart illustrating one exemplary process related to detecting and reducing browser replay attacks, consistent with exemplary aspects of certain embodiments of the present disclosure.

FIG. 4 is a flowchart illustrating one exemplary process 400 related to validating a login request using improved security features, consistent with exemplary aspects of at least some embodiments of the present disclosure. As shown in the exemplary flowchart of FIG. 4, secure login process 400 may comprise: receiving a login request, including processing user credentials and capturing browser print information associated with the login request, at 402; validating the login request, via analyzing current login attributes and/or an attributes checksum derived from the browser print information captured during the login request, and assessing the browser print information for spoofed browser attributes, at 404; redirecting an access attempt that is flagged as the potential replay attack to an enhanced security process, wherein the enhanced security process includes generating and sending second factor authentication, at 406; and allowing or denying login to customer accounts or information associated with the user credentials based on the enhanced security process, at 408.

In some embodiments, secure login process 400 may include, at 402, a step of receiving a login request via an online portal, including processing user credentials and capturing browser print information associated with the login request, at 402. With regard to the disclosed innovations, such online portal may include various graphical user interfaces (GUIs) provided to the user via the web browser application, and may be, for example, associated with the FSP system 112 and/or other provider system 114. Further, the online portal may be provided via at least one computer platform, such as an online computer platform. In on illustrative example, the at least one computer platform may comprise a financial service provider (FSP) system 112, i.e., as disclosed above in connection with FIG. 1. This FSP system may comprise one or more servers and/or processors associated with a financial service entity that provides, maintains, manages, or otherwise offers access to financial accounts online. Such FSP systems are frequently subject to credential reply attacks where attackers attempt to synthesize a login by posting credentials (e.g., username, password, etc.) obtained fraudulently along with spoofed browser print and/or device attributes, in attempt to circumvent the FSP system's login security. Such spoofed attributes may include timestamps, attributes checksums, and/or device attributes. In step 402, initial credentials are validated and a browser print of actual attributes is captured. If the initial login credentials (e.g., username, password, etc.) are correct, login is allowed to proceed to further risk assessment functionality, which may include a validating step 404 and browser print verification (FIG. 5), though where other browser, network, and other request details may also be assessed.

The secure login process 400 may include, at 404, a step of validating the login request, via analyzing current login attributes and/or an attributes checksum derived from the browser print information captured during the login request, and assessing the browser print information for spoofed browser attributes. According to various embodiments, here, such validating step may comprise one or both of: determining whether a captured timestamp of the current login data is stale or missing, at 410; and/or determining whether the attributes checksum of the login request is invalid or missing, at 412. One illustrative example of such validation process is set forth and described in connection with FIG. 5, below. Other validation of the device and/or browser print information may also be performed.

According to the embodiment of FIG. 4, exemplary secure login process 400 may also comprise one or both of: redirecting an access attempt that is flagged as the potential replay attack to an enhanced security process, wherein the enhanced security process includes generating and sending second factor authentication, at 406, and then allowing or denying login to customer accounts or information associated with the user credentials based on the enhanced security process, at 408. These and similar enhanced security processing may be performed once the browser print validation process fails, at step 404, i.e., a determination has been made that the login attempt is considered to be a potential credential replay attack.

Figure 5:
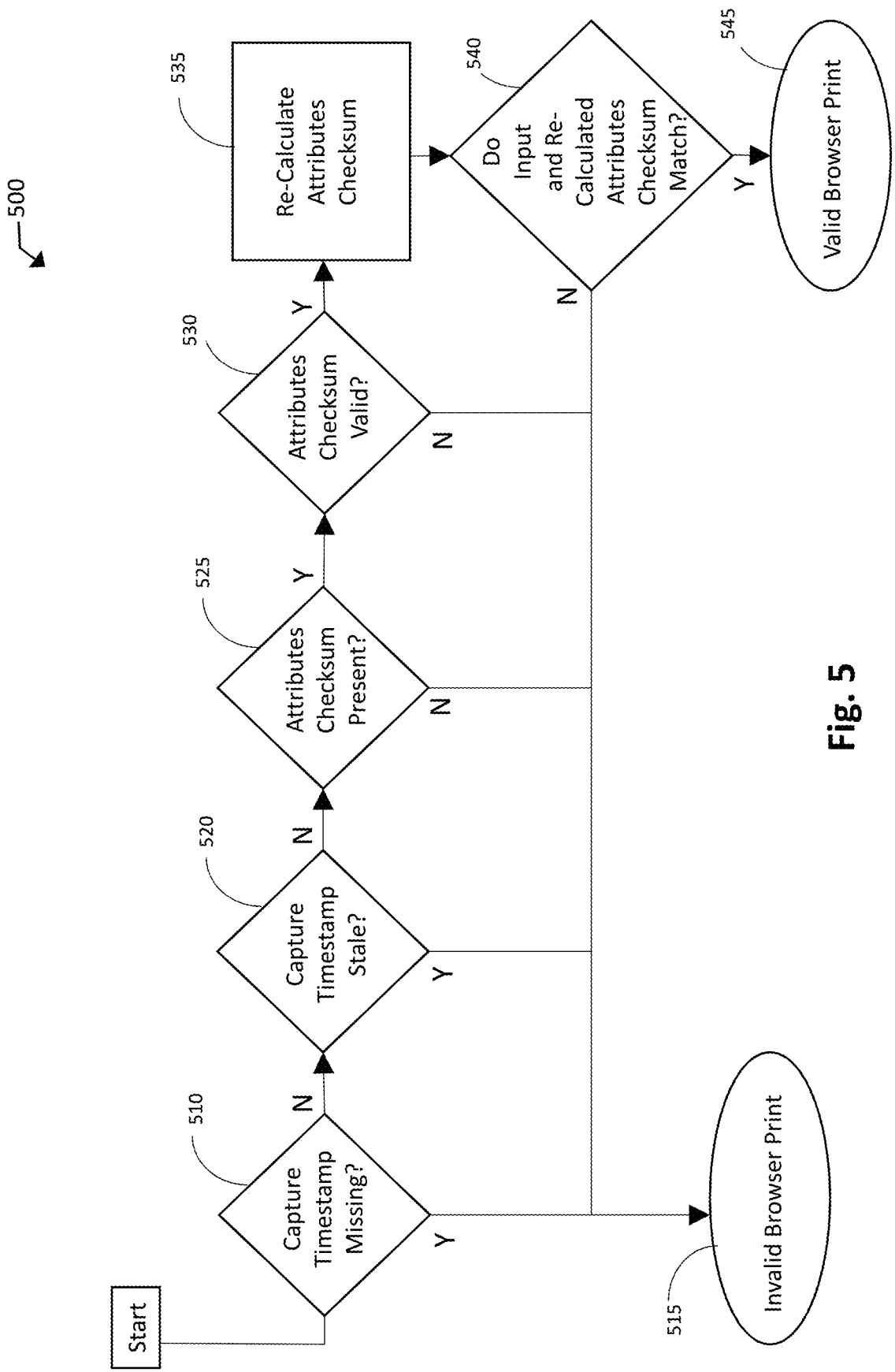
FIG. 5 is a flow diagram illustrating one exemplary process related to detecting and reducing browser replay attacks, consistent with exemplary aspects of certain embodiments of the present disclosure.

FIG. 5 is a flow diagram illustrating one exemplary process related to validating browser print information, consistent with exemplary aspects of certain embodiments of the present disclosure. As noted above, validation of browser print information, here, may be performed in connection with additional risk assessment analyses of browser, network, and other login request details. The browser print validation functionality herein is helpful for specifically identifying a suspect login attempt as a potential credential replay attack. A browser print validation process 500 may include a series of four initial steps (510, 520, 525, 530) which are shown in one order in the exemplary sequence of FIG. 5 for the purpose of illustration, though may be performed in any particular order; further, only a subset of these four initial steps may be performed in some implementations.

Referring to FIG. 5, the browser print validation process 500 may comprise determining if an expected timestamp is missing, at 510. If such timestamp is missing, the browser print information is deemed invalid, at 515. Once a determination is made that the browser print is invalid, the login may request second-factor authentication or other verification that the login request is being performed by the respective user. If a timestamp is present, the system may next verify whether the timestamp is stale, at 520. Here, if the timestamp is determined to be stale, the validation process 500 deems that the browser print is invalid, at 515. Additional exemplary details of various timestamp features and functionality, such as this verification whether a timestamp is stale, are set forth in connection with FIGS. 6A-6K, below. Turning back to FIG. 5, the browser print validation process 500 may assess whether an expect attributes checksum is present, at 525. If such a checksum is not present, the validation process 500 will make a determination that the browser print is invalid, at 515. If the attributes checksum is present, the validation process 500 may then next verify whether the attributes checksum is valid, at 530. If the attributes checksum is found to be valid, processing proceeds to step 535, otherwise the validation process will return that the browser print information is deemed invalid, at 515. Further details of illustrative examples of various attributes checksums are set forth in connection with FIGS. 6A-6K.

Once the validation process has assessed that the timestamp and attributes checksum values received are present and valid, e.g., at steps 510, 520, 525 and 530, the validation process 500 re-calculates the attributes checksum, at 535, and then compares the re-calculated checksum with the attributes checksum received with the login request (i.e., the potentially spoofed checksum), at 540. If the two checksums are different, the validation process 500 returns an output that the browser print is invalid, at 515. If the two checksums match, the validation process 500 returns an output that the browser print is valid, at 545.

Figure 6B:
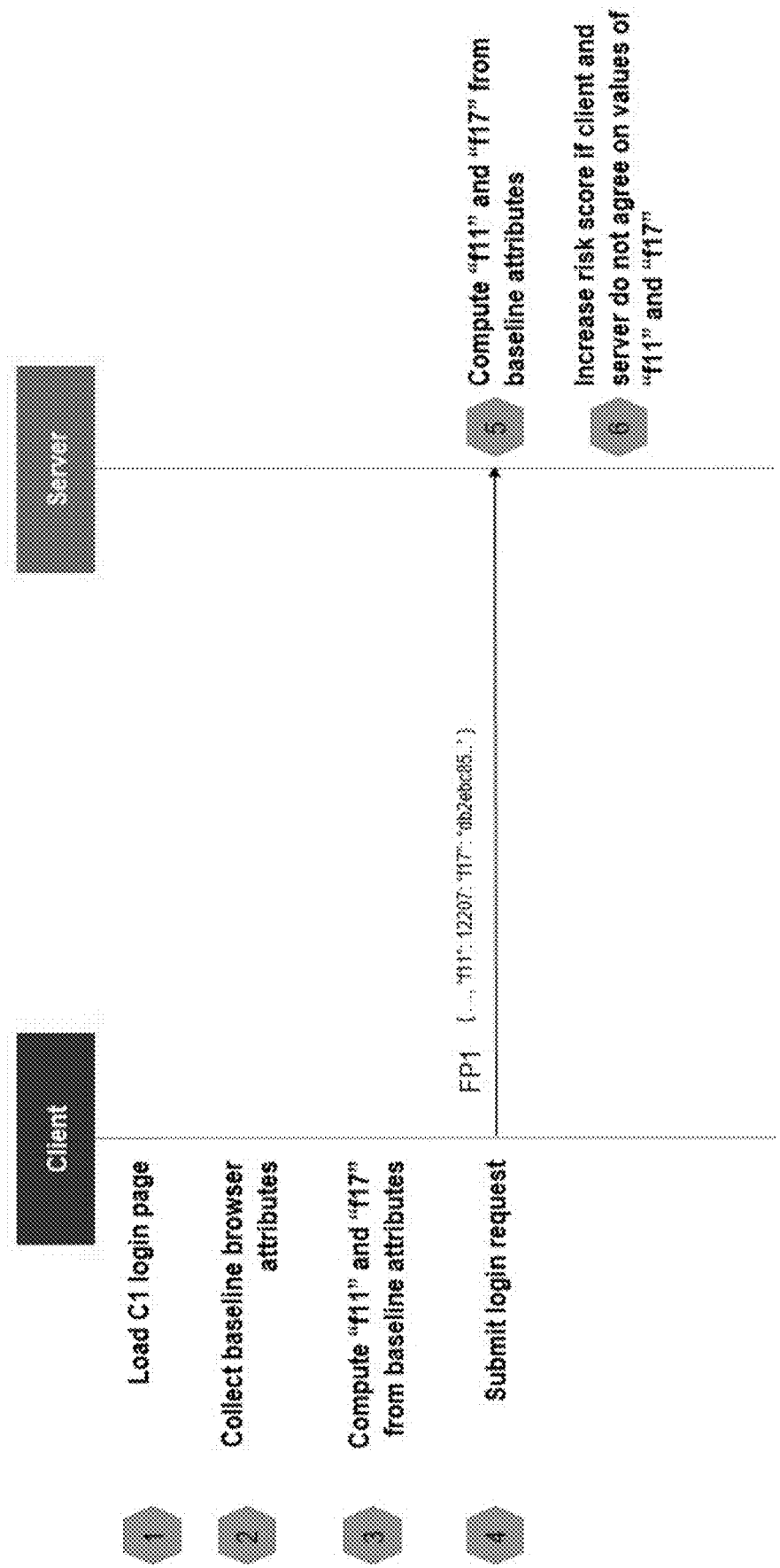

FIGS. 6A-6K are diagrams illustrating various features and functionality associated with detecting and reducing browser replay attacks via browser attributes, consistent with exemplary aspects of certain embodiments of the present disclosure. FIG. 6A depicts one representative example of a browser print and associated alpha-numerical information and attributes. FIG. 6A illustrates two portions of attributes data, at 601A and 601B, that are derived from the baseline browser attributes that are collected from the browser, with the remainder of the attributes information shown being exemplary of baseline attributes information collected from the browser. A value such as a variable-based value 601A, e.g. "f11," which may be a timestamp checksum number, may be generated to convert the browser timestamp into an arithmetic expression that may be more securely validated. As discussed above, a checksum 601B, such as "f17" shown, may also be derived or generated as a function of one or more static attributes and also, optionally, the variable-based or time-varying attribute, and/or as a function of some other attribute that varies in a manner capable of accurate recalculation from the captured attributes data, after the fact.

FIG. 6B is an illustrative flow diagram involving the client-server interactions of an example validation process for handling of a login request consistent with exemplary aspects of certain embodiments of the present disclosure. On the client side, in FIG. 6B, the process loads the login request page/information, collects the baseline browser attributes, computes 'f11' and 'f11' attributes checksums/values from the baseline attributes, and submits the login request. On the server side, the server (or corresponding or comparable computing device or devices) computes 'f11' and 'f11' from detected attributes information, independently, and returns a decision (e.g., increase risk score, determination that the login is a credential replay attack, etc.) if the values and 'f11' are not in agreement between the client and the server.

FIG. 6C is an illustration of exemplary browser attributes and associated calculations regarding an illustrative first checksum (f11'). Here, for example, an algorithm for 'f11' may convert the browser timestamp into an arithmetic expression and further process such expression to generate a timestamp checksum number for 'f11'. FIG. 6D is an illustration of exemplary browser attributes and associated calculations of an illustrative checksum value. In the example embodiment shown, the checksum algorithm may perform, inter alia, a SHA-256 hash on the browser print with a specific ordering of the attributes. FIG. 6E is a table listed a variety of results of an exemplary validation process, as also shown and described in connection with FIG. 5.

Figure 6F:
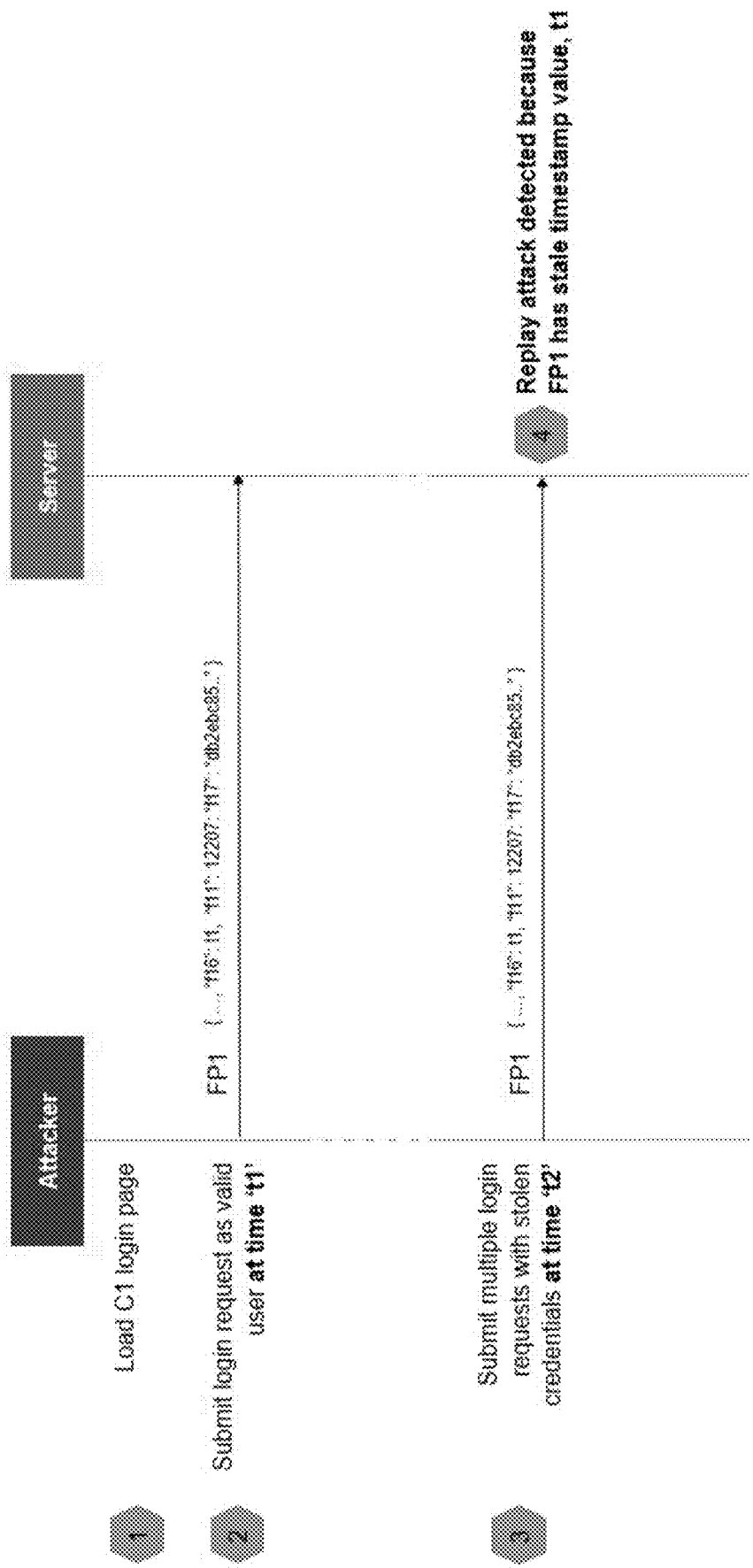
Figure 6G:
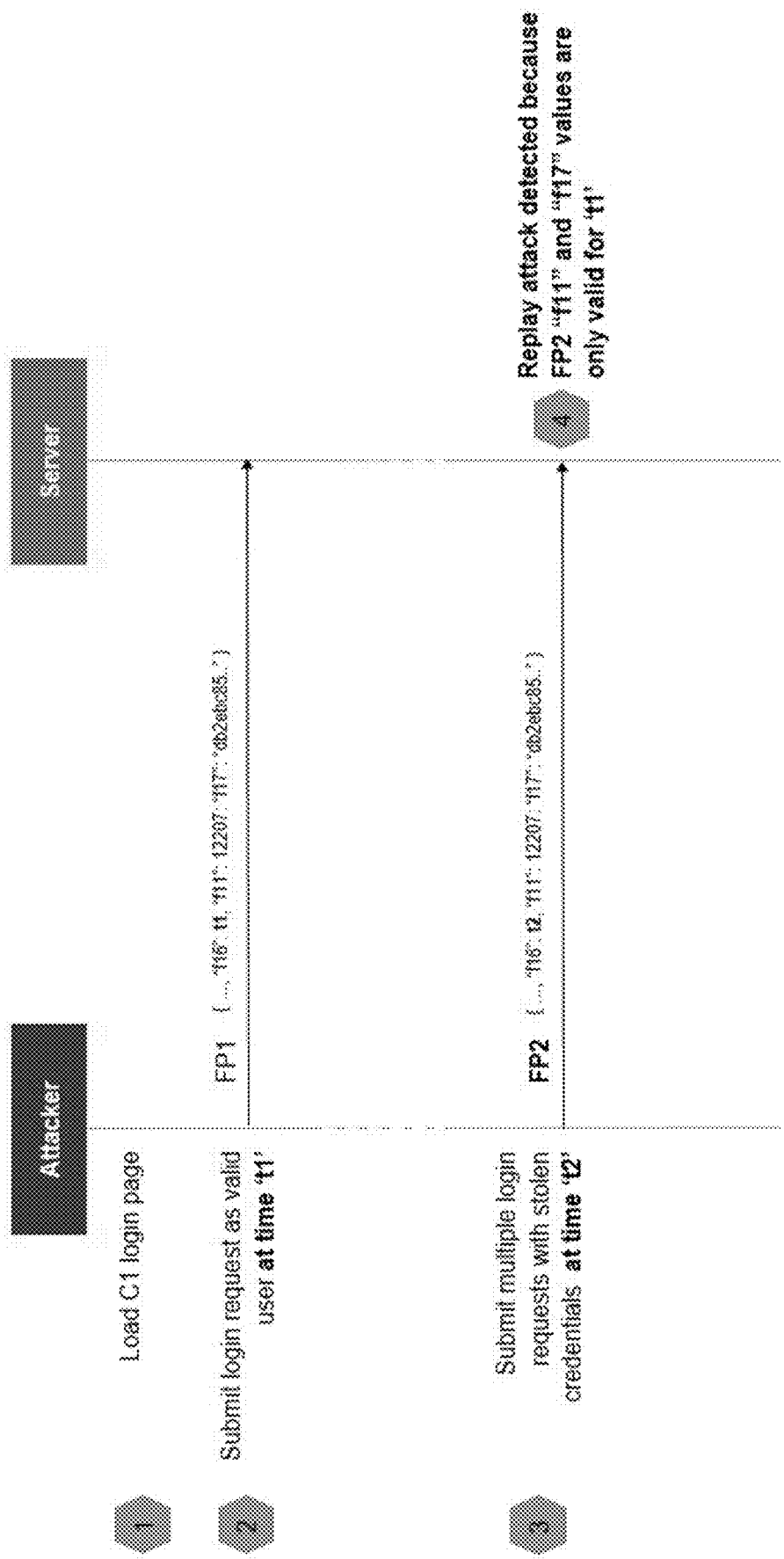

FIG. 6F illustrates a first way that certain embodiments of the present disclosure may prevent a credential replay attack. As set forth in FIG. 6F, while a first login request by an attacker at 'time t1' may involve other detection and/or prevention, any later login request with the stolen credentials at 'time t2' or later would be deemed replay attacks because the timestamp value is stale. FIG. 6G illustrates a second way that some embodiments of the present disclosure may prevent a credential replay attack. As set forth in FIG. 6G, a first login request by an attacker at 'time t1' is shown at top, wherein a later login request with the stolen credentials at 'time t2' or later would be deemed replay attacks because one or both of the base checksum (f11) and the attributes checksum (f17) are invalid. Here, such 'f11' and 'f11' values are only valid at time t1.

Figure 6H:
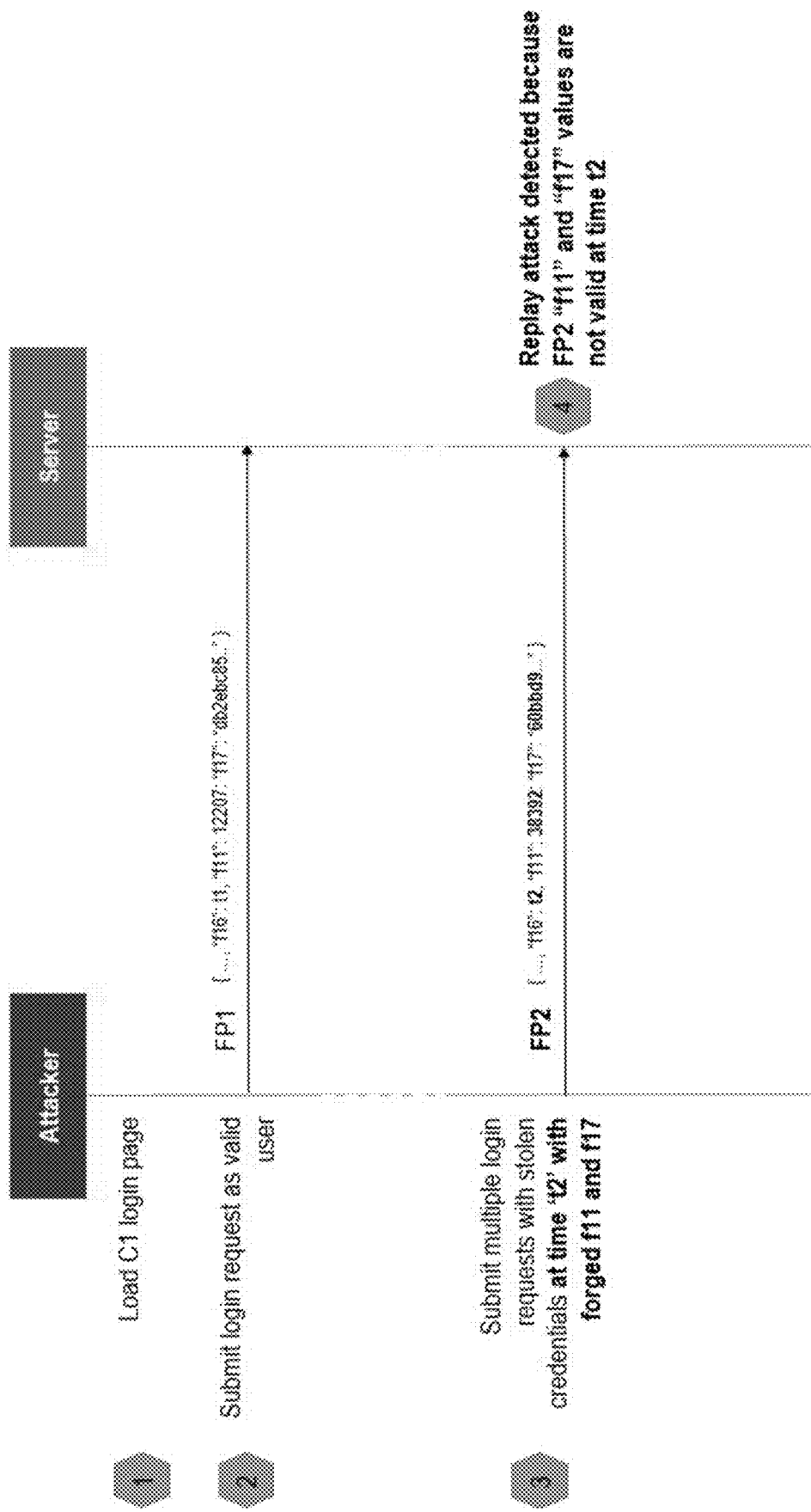

FIG. 6H illustrates a third way some embodiments of the present disclosure may prevent a credential replay attack. As set forth in FIG. 6H, while a first login request as a valid user at 'time t1' would have correct 'f11' and 'f17' values, any later login requests by an attacker using these stolen credentials, at 'time t2' or later, would be a deemed replay attack. Here, even if the attacker submitted the later login requests with forged 'f11' and 'f17' values, these forged values would not be valid at time 2, i.e., in connection with the correct recalculations of these values at this later time.

Figure 6I:
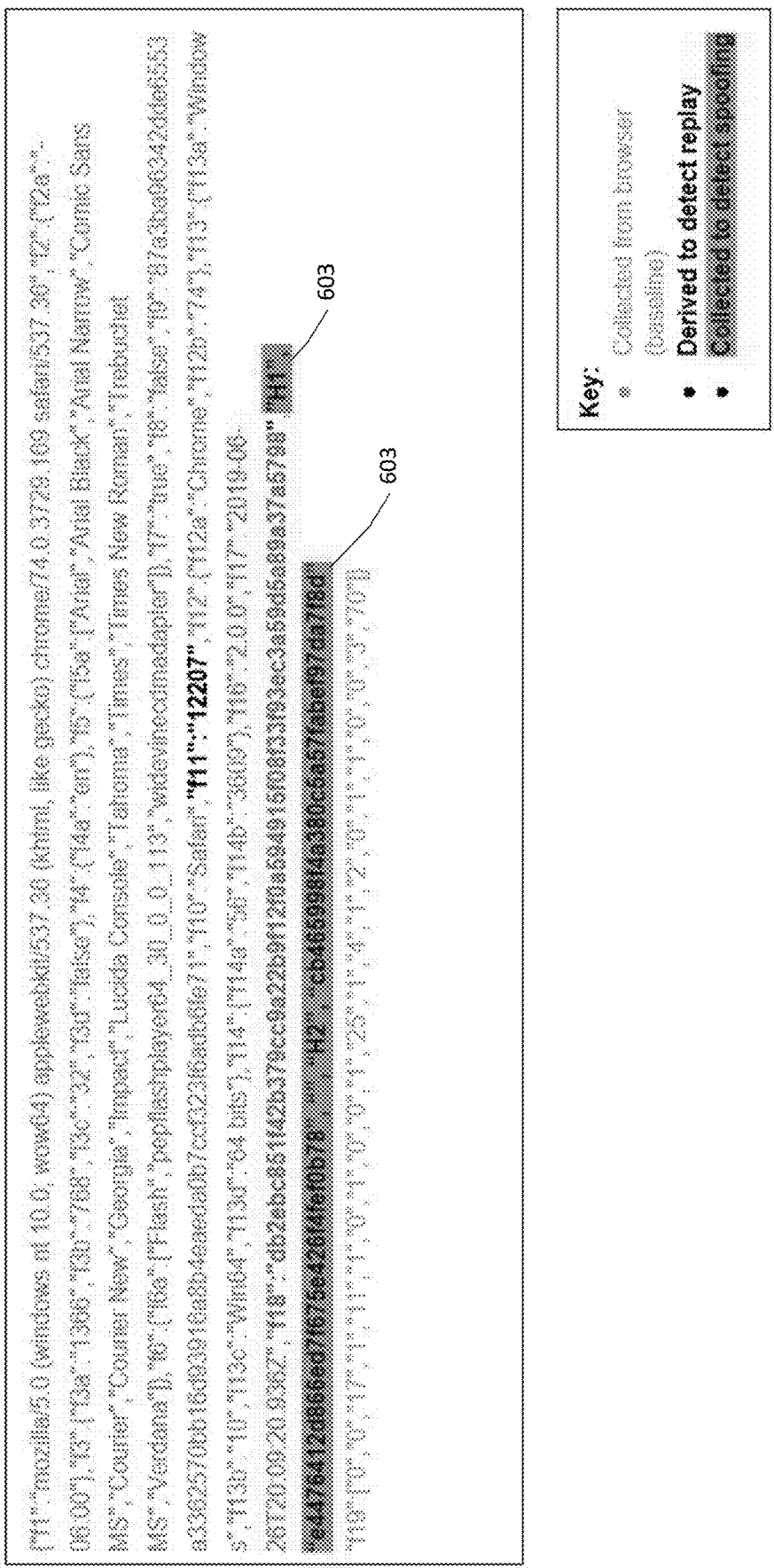
Figure 6J:
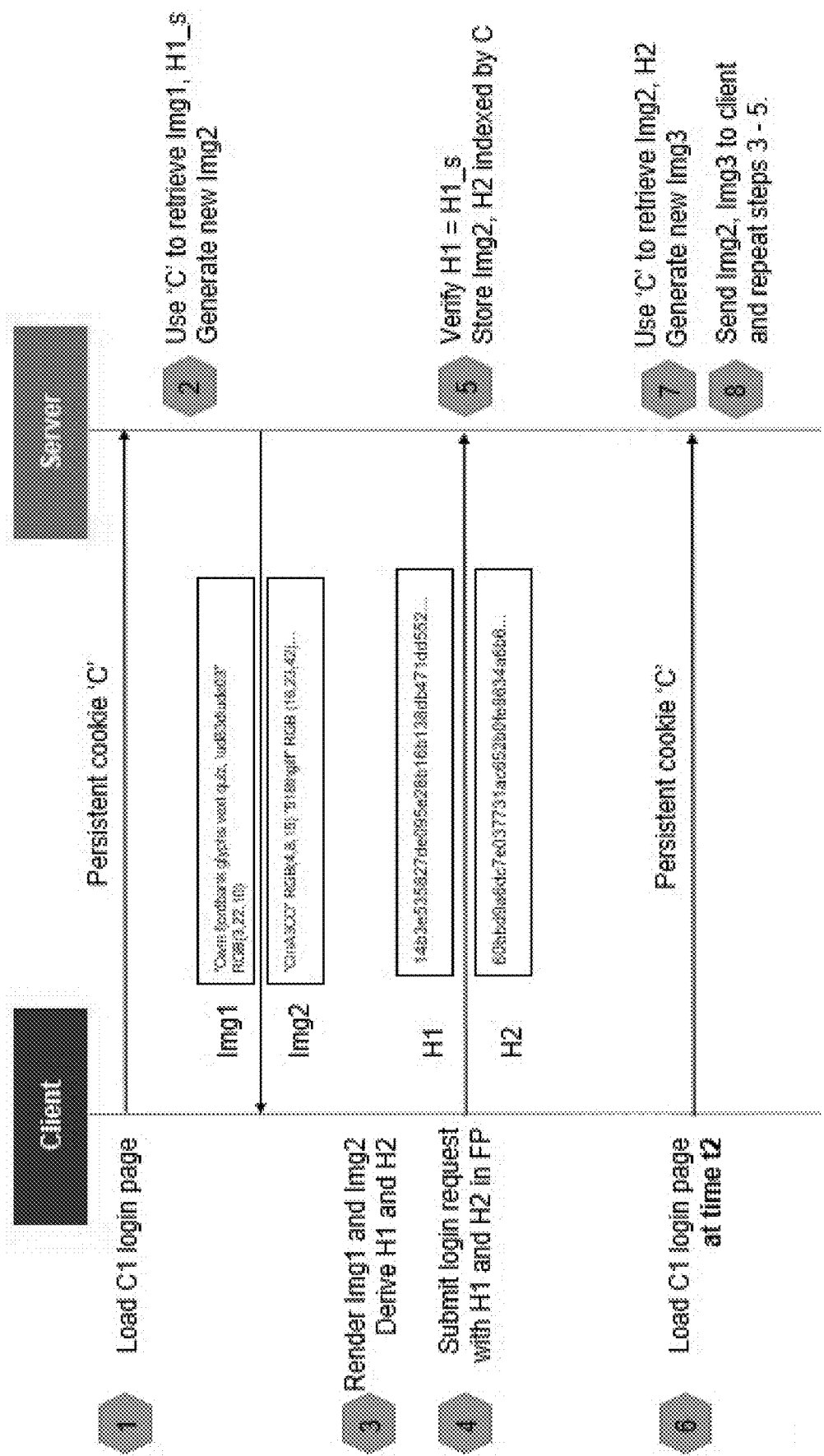

FIG. 6I depicts another representative example of a browser print and associated alpha-numerical information and attributes, illustrating how the innovations herein may be utilized to develop spoofing-resistant attributes. FIG. 6I illustrates a portion of browser print/attributes data, at 603, that is collected to detect spoofing. Here, for example, spoofing may be detected by using a stored hash and comparing it against a received hash via use of a challenge image. FIG. 6J helps further illustrate how a browser spoofing attack may be detected consistent with such embodiments. As shown in FIG. 6J, upon loading of the login page at the client, persistent cookie information 'C' is shared with the server. The server uses the cookie 'C' to retrieve a first image, Img1, from the client and generate a new image, Img2, via a known hashing process, where the new image (Img2) is transmitted back to the client. The client then renders image 1 and image 2 to derive hash values, H1 and H2, and transmit these back to the server along with the login request. The server then verifies the login by verifying H1, stores image 2 and H2, and indexes H2 via cookie 'C'. As such, during subsequent logins, the server may utilize the persistent cookie 'C' information to retrieve image 2, and use H2 to generate new image 3, where images 2 and 3 are sent back to the client to queue up the server for properly validating the user for this second login request and for subsequent login request(s).

Figure 6K:
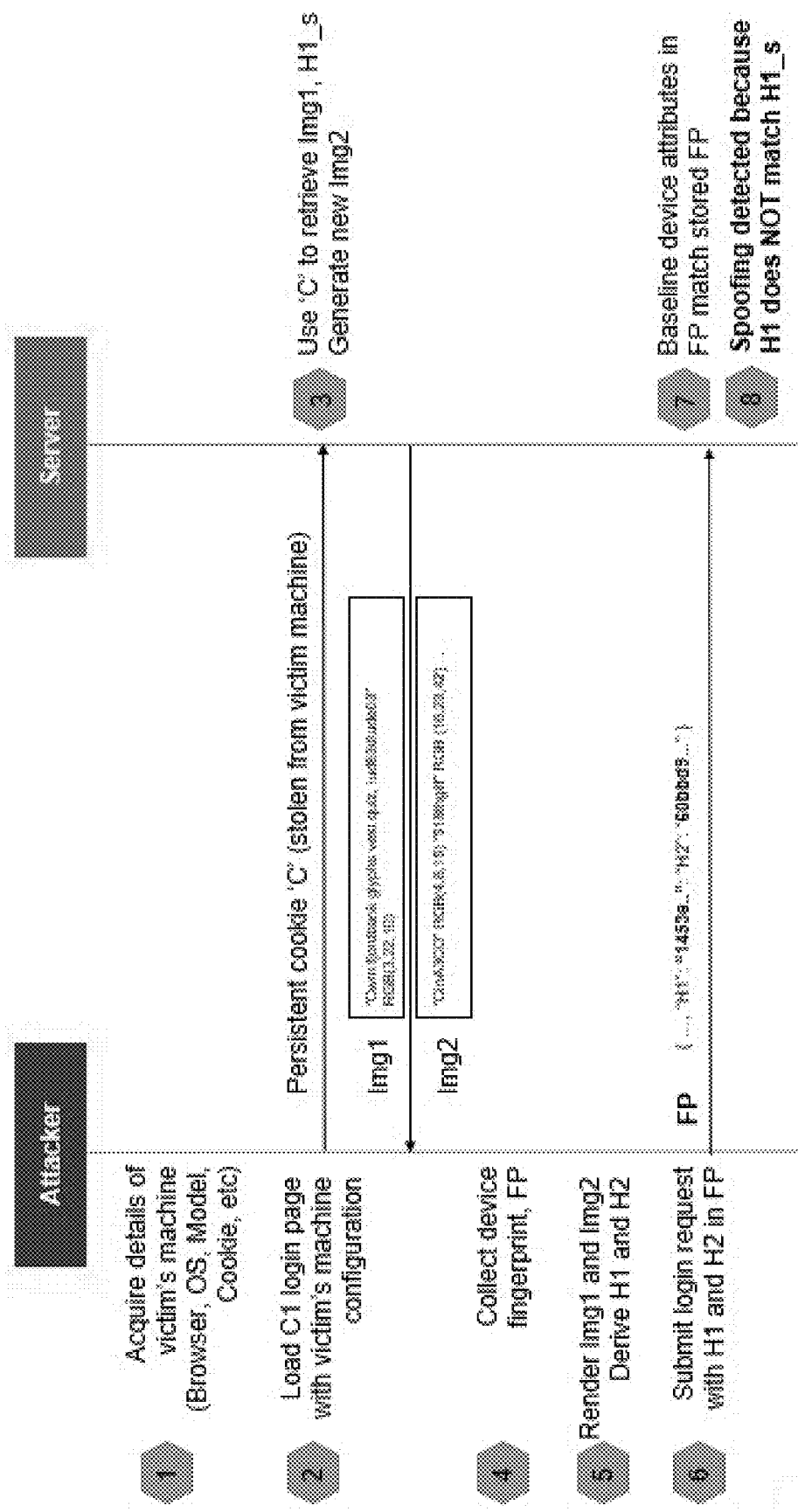

FIG. 6K illustrates how the implementation of FIGS. 6I-6J may prevent a spoofing attack when the attacker covertly acquires victim's device details and spoofs them to attack the server/site. Namely, in FIG. 6K, the attacker acquires details of the victim's machine (e.g., browser, OS, model, cookie, etc.) and submits a login request with stolen credentials and using the persistent cookie 'C' stolen from the victim's machine. Next, the server uses 'C' to retrieve image 1 and then generate and send new image 2 back to the client, as described above. As part of the login attempt, the login process first collects the device fingerprint info, FP, then renders image 1 and image 2 to derive H1 and H2, which are then integrated with the device fingerprint info that is submitted with the login request. Here, then, even though the baselines device attributes sent in the fingerprint might match the device attributes known or stored, the spoofing attack will be detected because the H1 value derived by the client (attacker), H1 derived, will not match the H1 value used by the server to generate image 2, H1_s.

Figure 7:
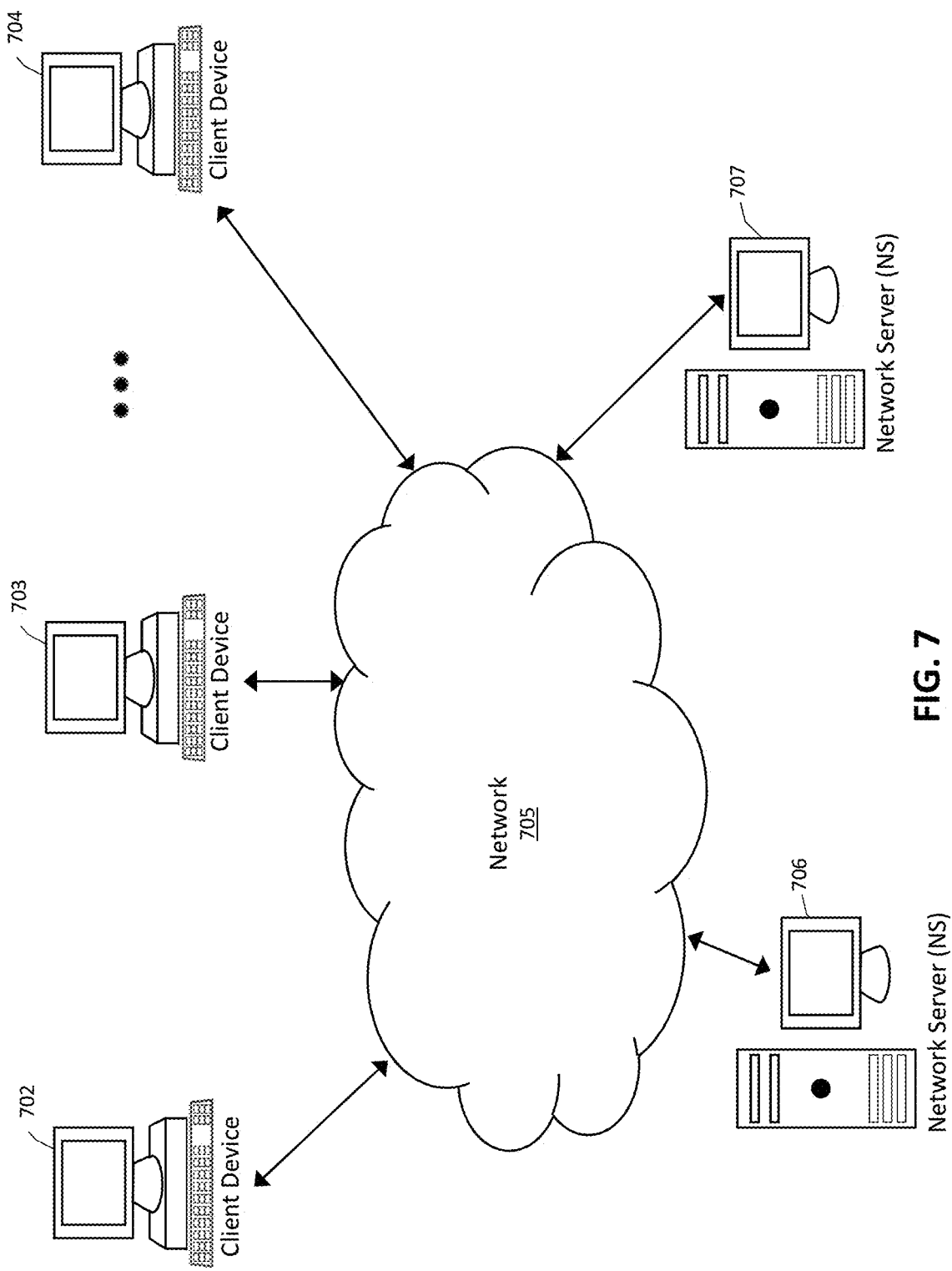
FIG. 7 is a block diagram depicting an exemplary computer-based system and/or platform, in accordance with certain embodiments of the present disclosure.

FIG. 7 depicts a block diagram of an exemplary computer-based system/platform in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the exemplary inventive computing devices and/or the exemplary inventive computing components of the exemplary computer-based system/platform may be configured to manage a large number of members (e.g., clients, and their users) and/or concurrent transactions, as detailed herein. In some embodiments, the exemplary computer-based system/platform may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 7, members 702-704 (e.g., clients) of the exemplary computer-based system/platform may include virtually any computing device capable of receiving and sending a message over a network (e.g., cloud network), such as network 705, to and from another computing device, such as servers 706 and 707, each other, and the like. In some embodiments, the member devices 702-704 may be personal computers, multiprocessor systems, microprocessor-based or programmable consumer electronics, network PCs, and the like. In some embodiments, one or more member devices within member devices 702-704 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 702-704 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 5G, GSM, GPRS, WiFi, WiMax, CDMA, satellite, ZigBee, etc.). In some embodiments, one or more member devices within member devices 702-704 may include may run one or more applications, such as Internet browsers, mobile applications, voice calls, video games, videoconferencing, and email, among others. In some embodiments, one or more member devices within member devices 702-704 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 702-704 may be specifically programmed by either Java, .Net, QT, C, C++ and/or other suitable programming language. In some embodiments, one or more member devices within member devices 702-704 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 705 may provide network access, data transport and/or other services to any computing device coupled to it. In some embodiments, the exemplary network 705 may include and implement at least one specialized network architecture that may be based at least in part on one or more standards set by, for example, without limitation, GlobalSystem for Mobile communication (GSM) Association, the Internet Engineering Task Force (IETF), and the Worldwide Interoperability for Microwave Access (WiMAX) forum. In some embodiments, the exemplary network 705 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 705 may include and implement, as an alternative or in conjunction with one or more of the above, a WiMAX architecture defined by the WiMAX forum. In some embodiments and, optionally, in combination of any embodiment described above or below, the exemplary network 705 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 705 may be transmitted based at least in part on one of more communication modes such as but not limited to: NFC, RFID, Narrow Band Internet of Things (NBIOT), ZigBee, 3G, 4G, 5G, GSM, GPRS, WiFi, WiMax, CDMA, satellite and any combination thereof. In some embodiments, the exemplary network 705 may also include mass storage, such as network attached storage (NAS), a storage area network (SAN), a content delivery network (CDN) or other forms of computer- or machine-readable media.

In some embodiments, the exemplary server 706 or the exemplary server 707 may be a web server (or a series of servers) running a network operating system, examples of which may include but are not limited to Microsoft Windows Server, Novell NetWare, or Linux. In some embodiments, the exemplary server 706 or the exemplary server 707 may be used for and/or provide cloud and/or network computing. Although not shown in FIG. 1, in some embodiments, the exemplary server 706 or the exemplary server 707 may have connections to external systems like email, SMS messaging, text messaging, ad content providers, etc. Any of the features of the exemplary server 706 may be also implemented in the exemplary server 707 and vice versa.

In some embodiments, one or more of the exemplary servers 706 and 707 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 701-704.

In some embodiments and, optionally, in combination of any embodiment described above or below, for example, one or more exemplary computing member devices 702-704, the exemplary server 706, and/or the exemplary server 707 may include a specifically programmed software module that may be configured to send, process, and receive information using a scripting language, a remote procedure call, an email, a tweet, Short Message Service (SMS), Multimedia Message Service (MIMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 8:
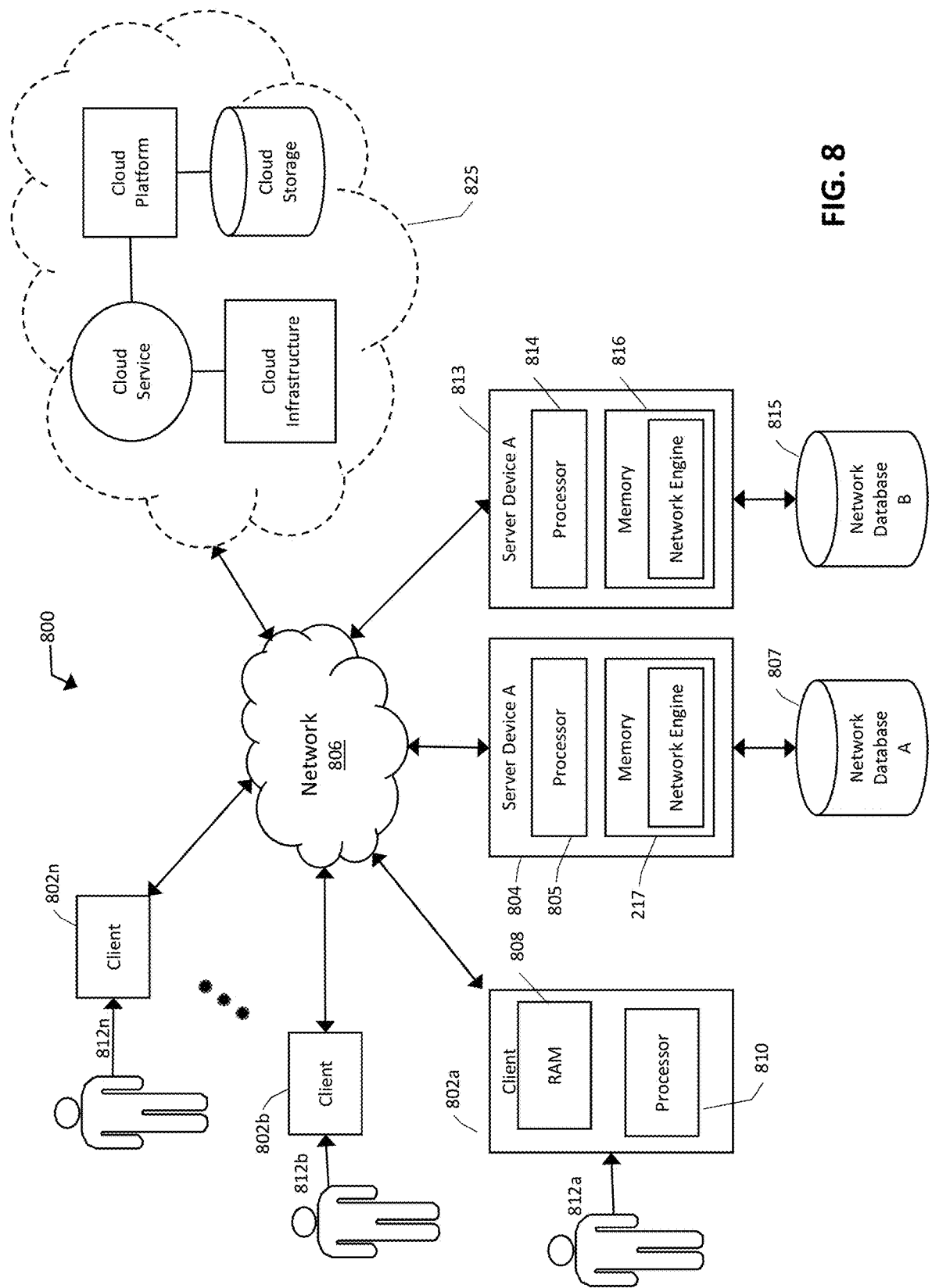
FIG. 8 is a block diagram depicting another exemplary computer-based system and/or platform, in accordance with certain embodiments of the present disclosure.

FIG. 8 depicts a block diagram of another exemplary computer-based system/platform 800 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 802a, 802b thru 802n shown each at least includes a computer-readable medium, such as a random-access memory (RAM) 808 coupled to a processor 810 or FLASH memory. In some embodiments, the processor 810 may execute computer-executable program instructions stored in memory 808. In some embodiments, the processor 810 may include a microprocessor, an ASIC, and/or a state machine. In some embodiments, the processor 810 may include, or may be in communication with, media, for example computer-readable media, which stores instructions that, when executed by the processor 810, may cause the processor 810 to perform one or more steps described herein. In some embodiments, examples of computer-readable media may include, but are not limited to, an electronic, optical, magnetic, or other storage or transmission device capable of providing a processor, such as the processor 810 of client 802a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 802a-n may also comprise a number of external or internal devices such as a mouse, a CD-ROM, DVD, a physical or virtual keyboard, a display, or other input or output devices. In some embodiments, examples of member computing devices 802a-n (e.g., clients) may be any type of processor-based platforms that are connected to a network 806 such as, without limitation, personal computers, digital assistants, personal digital assistants, smart phones, pagers, digital tablets, laptop computers, Internet appliances, and other processor-based devices. In some embodiments, member computing devices 802a-n may be specifically programmed with one or more application programs in accordance with one or more principles/methodologies detailed herein. In some embodiments, member computing devices 802a-n may operate on any operating system capable of supporting a browser or browser-enabled application, such as Microsoft™, Windows™, and/or Linux. In some embodiments, member computing devices 802a-n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 802a-n, users, 812a-n, may communicate over the exemplary network 806 with each other and/or with other systems and/or devices coupled to the network 806. As shown in FIG. 8, exemplary server devices 804 and 813 may be also coupled to the network 806. In some embodiments, one or more member computing devices 802a-n may be mobile clients.

In some embodiments, at least one database of exemplary databases 807 and 815 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 9:
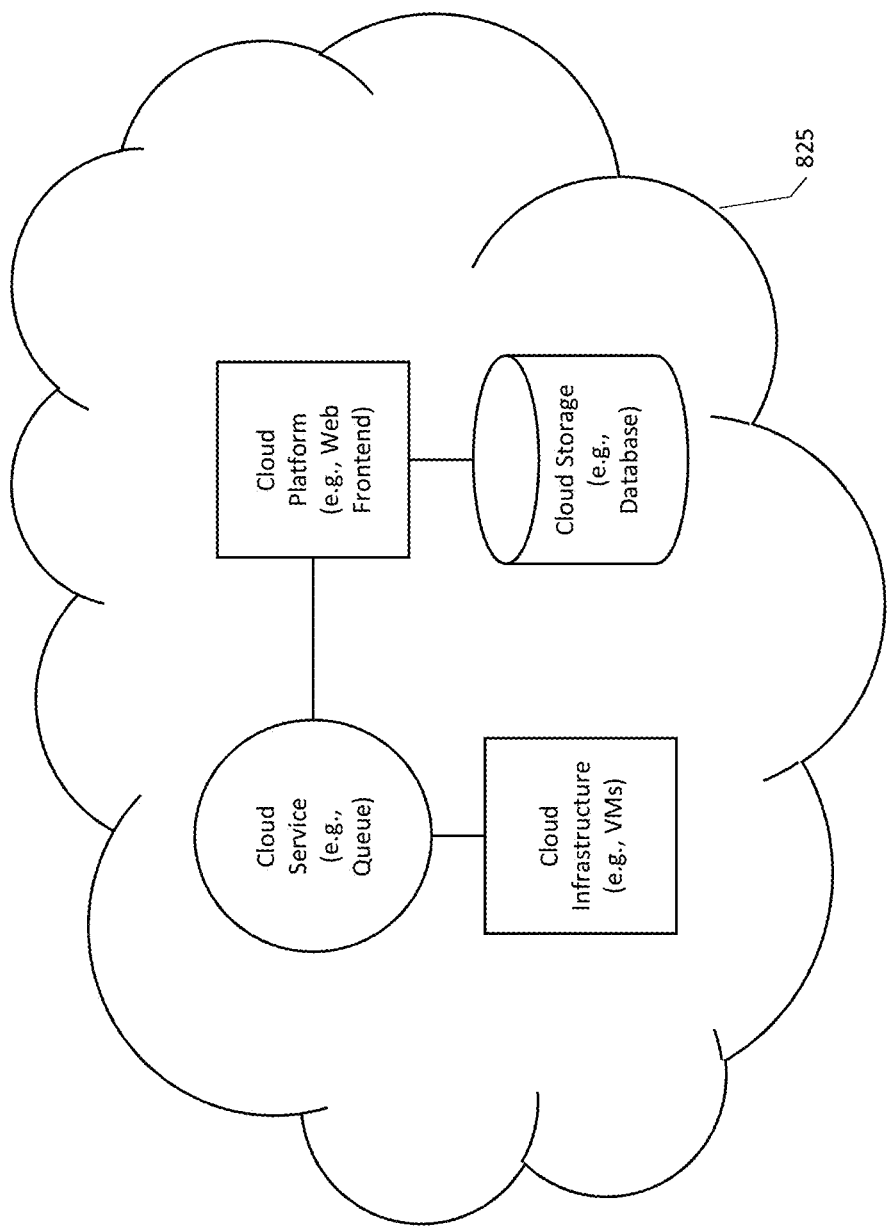
FIGS. 9 and 10 are diagrams illustrating two exemplary implementations of cloud computing architecture/aspects with respect to which the disclosed technology may be specifically configured to operate, in accordance with certain embodiments of the present disclosure.

As also shown in FIGS. 8 and 9, some embodiments of the disclosed technology may also include and/or involve one or more cloud components 825, which are shown grouped together in the drawing for sake of illustration, though may be distributed in various ways as known in the art. Cloud components 825 may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.).

Figure 10:
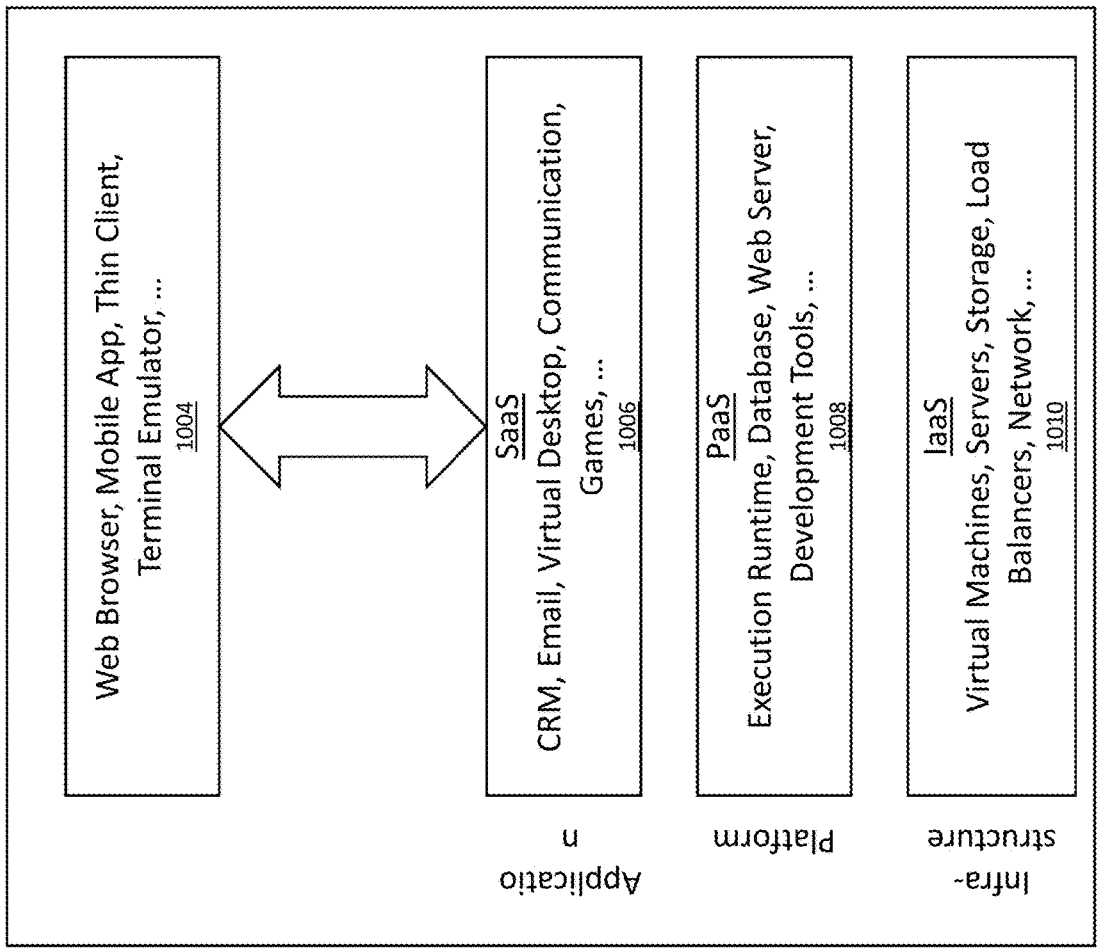

According to some embodiments shown by way of one example in FIG. 10, the exemplary inventive computer-based systems/platforms, the exemplary inventive computer-based devices, components and media, and/or the exemplary inventive computer-implemented methods of the present disclosure may be specifically configured to operate in or with cloud computing/architecture such as, but not limiting to: infrastructure a service (IaaS) 410, platform as a service (PaaS) 408, and/or software as a service (SaaS) 406. FIGS. 9 and 10 illustrate schematics of exemplary implementations of the cloud computing/architecture(s) in which the exemplary inventive computer-based systems/platforms, the exemplary inventive computer-implemented methods, and/or the exemplary inventive computer-based devices, components and/or media of the present disclosure may be specifically configured to operate. In some embodiments, such cloud architecture 1006, 1008, 1010 may be utilized in connection with the Web browser and browser extension aspects, shown at 1004, to achieve the innovations herein.

As used in the description and in any claims, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, exemplary inventive, specially programmed computing systems/platforms with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk™, TCP/IP (e.g., HTTP), Bluetooth™, near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. Various embodiments herein may include interactive posters that involve wireless, e.g., Bluetooth™ and/or NFC, communication aspects, as set forth in more detail further below. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) are within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components (e.g., FIG. 3-4) and cloud servers are examples.

In some embodiments, as detailed herein, one or more of exemplary inventive computer-based systems/platforms, exemplary inventive computer-based devices, and/or exemplary inventive computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of exemplary inventive computer-based systems/platforms, exemplary inventive computer-based devices, and/or exemplary inventive computer-based components of the present disclosure may be implemented across one or more of various computer platforms such as, but not limited to: (1) AmigaOS, AmigaOS 4; (2) FreeBSD, NetBSD, OpenBSD; (3) Linux; (4) Microsoft Windows; (5) OpenVMS; (6) OS X (Mac OS); (7) OS/2; (8) Solaris; (9) Tru64 UNIX; (10) VM; (11) Android; (12) Bada; (13) BlackBerry OS; (14) Firefox OS; (15) Ios; (16) Embedded Linux; (17) Palm OS; (18) Symbian; (19) Tizen; (20) WebOS; (21) Windows Mobile; (22) Windows Phone; (23) Adobe AIR; (24) Adobe Flash; (25) Adobe Shockwave; (26) Binary Runtime Environment for Wireless (BREW); (27) Cocoa (API); (28) Cocoa Touch; (29) Java Platforms; (30) JavaFX; (31) JavaFX Mobile; (32) Microsoft XNA; (33) Mono; (34) Mozilla Prism, XUL and XULRunner; (35) .NET Framework; (36) Silverlight; (37) Open Web Platform; (38) Oracle Database; (39) Qt; (40) SAP NetWeaver; (41) Smartface; (42) Vexi; and/OR (43) Windows Runtime.

In some embodiments, exemplary inventive computer-based systems/platforms, exemplary inventive computer-based devices, and/or exemplary inventive computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, exemplary inventive computer-based systems/platforms, exemplary inventive computer-based devices, and/or exemplary inventive computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, smart watch, or any other reasonable mobile electronic device.

As used herein, terms "proximity detection," "locating," "location data," "location information," and "location tracking" refer to any form of location tracking technology or locating method that can be used to provide a location of, for example, a particular computing device/system/platform of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

The aforementioned examples are, of course, illustrative and not restrictive.

As used herein, the term "user" shall have a meaning of at least one user. In some embodiments, the terms "user", "subscriber", "consumer", or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

At least some aspects of the present disclosure will now be described with reference to the following numbered clauses.

1. A computer-implemented method of improved login security, the method comprising: collecting, by at least one processor, prior login data associated with prior logins by one or more users;

processing, by the at least one processor, a login request, including capturing user credentials and browser print information associated with the login request, the browser print information comprising current login attributes and an attributes checksum;

validating the login request, including analyzing one or both of the current login attributes and the attributes checksum derived from the browser print information captured during the login request, wherein the analyzing comprises assessing the browser print information for spoofed browser attributes including:

determining whether a captured timestamp of the current login data is stale or missing;

determining whether the attributes checksum of the login request is invalid or missing; and flagging the login request as a potential replay attack when at least one of the captured timestamp is stale, and the captured timestamp is missing, the attributes checksum is invalid, and the attributes checksum is missing;

redirecting an access attempt that is flagged as the potential replay attack to an enhanced security process, wherein the enhanced security process includes generating and sending second factor authentication; and allowing or denying login to customer accounts or information associated with the user credentials based on the enhanced security process.

2. The method of claim 1 wherein the current login data comprises information regarding the login request including one or more of time information, a timestamp, date information, browser information, network information, and/or device information.

3. The method of claim 1 wherein the attributes checksum comprises a dynamic, time-varying checksum that is generated at a time the browser print is created, wherein the attributes checksum is computed as a function of the login attributes associated with the browser print created.

4. The method of claim 1 wherein the second-factor authentication comprises initiating communication to an entity or device associated with the login request, the second factor authentication requiring further proof of the user's identity prior to granting access.

5. The method of claim 1 further comprising:
executing a Javascript collector to capture the browser print information.

6. The method of claim 5 wherein the attributes checksum comprises a dynamic, time-varying checksum that is generated by the Javascript collector at a time the browser print is created, wherein the Javascript collector computes the attributes checksum as a function of the login attributes associated with the browser print created.

7. The method of claim 1 wherein the step of processing the login request further comprises calculating the attributes checksum using a time-varying hash of a timestamp captured with the current login attributes.

8. The method of claim 1 wherein the step of processing the login request further comprises calculating the attributes checksum using a hash generated from non-static data captured with the current login attributes.

9. The method of claim 1 wherein the processing/receiving the login request further comprises calculating the attributes checksum using baseline browser attributes derived from the browser print information by means of an algorithm, wherein the algorithm comprises:

calculating a timestamp from the baseline browser attributes associated with the browser print; and calculating a checksum from the baseline browser attributes associated with the browser print;

wherein the calculated timestamp and checksum are calculated on the server side and compared against corresponding data, received with the login request, ostensibly calculated from the same baseline browser attributes captured on a client side at a time when the user initiated the login request.

10. The method of claim 9, wherein the checksum is calculated based on at least one time-varying attribute of the baseline browser attributes.

11. A computer-implemented method of improved login security, the method comprising: processing, by the at least one processor, a login request, including capturing user credentials and browser print information associated with the login request, the browser print information comprising current login attributes and an attributes checksum;

validating, by at least one server, the login request, including analyzing one or both of the current login attributes and the attributes checksum derived based on at least one time- or other-attribute-varying value associated with the browser print information captured during the login request, wherein the analyzing comprises assessing the browser print information for spoofed browser attributes including:

determining whether a captured timestamp of the current login data is stale or missing; determining whether the attributes checksum of the login request is invalid or missing; and flagging the login request as a potential replay attack when at least one of the captured timestamp is stale, and the captured timestamp is missing, the attributes checksum is invalid, and the attributes checksum is missing;

redirecting an access attempt that is flagged as the potential replay attack to an enhanced security process, wherein the enhanced security process includes initiating second factor authentication; and allowing or denying login to customer accounts or information associated with the user credentials based on the enhanced security process.

12. The method of claim 11 wherein the current login data comprises information regarding the login request including one or more of time information, a timestamp, date information, browser information, network information, and/or device information.

13. The method of claim 11 wherein the attributes checksum comprises a dynamic, time-varying checksum that is generated at a time the browser print is created, wherein the attributes checksum is computed as a function of the login attributes associated with the browser print created.

14. The method of claim 11 wherein the second-factor authentication comprises initiating communication to an entity or device associated with the login request, the second factor authentication requiring further proof of the user's identity prior to granting access.

15. The method of claim 11 further comprising:
executing a Javascript collector to capture the browser print information.

16. The method of claim 15 wherein the attributes checksum comprises a dynamic, time-varying checksum that is generated by the Javascript collector at a time the browser print is created, wherein the Javascript collector computes the attributes checksum as a function of the login attributes associated with the browser print created.

17. The method of claim 11 wherein the step of processing the login request further comprises calculating the attributes checksum using a time-varying hash of a timestamp captured with the current login attributes.

18. The method of claim 11 wherein the step of processing the login request further comprises calculating the attributes checksum using a hash generated from non-static data captured with the current login attributes.

19. The method of claim 11 wherein the processing/receiving the login request further comprises calculating the attributes checksum using baseline browser attributes derived from the browser print information by means of an algorithm, wherein the algorithm comprises:
calculating a timestamp from the baseline browser attributes associated with the browser print; and
calculating a checksum from the baseline browser attributes associated with the browser print;
wherein the calculated timestamp and checksum are calculated on the server side and compared against corresponding data, received with the login request, ostensibly calculated from the same baseline browser attributes captured on a client side at a time when the user initiated the login request.

20. The method of claim 19 wherein the checksum is calculated based on the at least one time-varying value that is contained within the baseline browser attributes.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems/platforms, and the inventive devices described herein can be utilized in any combination with each other. Further still, the various steps may be carried out in any desired order (and any desired steps may be added and/or any desired steps may be eliminated).

The invention claimed is:

1. A computer-implemented method of improved login security, the method comprising:
collecting, by at least one processor, prior login data associated with prior logins by one or more users;
processing, by the at least one processor, a login request, including capturing user credentials and browser print information associated with the login request, the browser print information comprising current login attributes and an attributes checksum, wherein the attributes checksum is computed based on a set of one or more alphanumeric strings of data that are derived from baseline data of the browser print information;
validating, by the at least one processor, the login request, including analyzing one or both of the current login attributes and the attributes checksum derived from the browser print information captured during the login request, wherein the analyzing comprises assessing the browser print information for spoofed browser attributes including:
determining whether a captured timestamp of the current login data is stale or missing;
determining whether the attributes checksum of the login request is invalid or missing; and
flagging the login request as a potential replay attack when at least one of the captured timestamp is stale, and the captured timestamp is missing, the attributes checksum is invalid, and the attributes checksum is missing;
redirecting, by the at least one processor, an access attempt that is flagged as the potential replay attack to an enhanced security process, wherein the enhanced security process includes generating and sending second factor authentication; and
allowing or denying, by the at least one processor, login to customer accounts or information associated with the user credentials based on the enhanced security process.

2. The method of claim 1 wherein the current login data comprises information regarding the login request including time information (timestamp), date information, browser information, network information, device information.

3. The method of claim 1 wherein the attributes checksum comprises a dynamic, time-varying checksum that is generated at a time the browser print is created, wherein the attributes checksum is computed as a function of the login attributes associated with the browser print created.

4. The method of claim 1 wherein the second-factor authentication comprises initiating communication to an entity or device associated with the login request, the second factor authentication requiring further proof of the user's identity prior to granting access.

5. The method of claim 1 further comprising:
executing a Javascript collector to capture the browser print information.

6. The method of claim 5 wherein the attributes checksum comprises a dynamic, time-varying checksum that is generated by the Javascript collector at a time the browser print is created, wherein the Javascript collector computes the attributes checksum as a function of the login attributes associated with the browser print created.

7. The method of claim 1 wherein the step of processing the login request further comprises calculating the attributes checksum using a time-varying hash of a timestamp captured with the current login attributes.

8. The method of claim 1 wherein the step of processing the login request further comprises calculating the attributes checksum using a hash generated from non-static data captured with the current login attributes.

9. The method of claim 1 wherein the processing/receiving the login request further comprises calculating the attributes checksum using baseline browser attributes derived from the browser print information by means of an algorithm, wherein the algorithm comprises:
calculating a timestamp from the baseline browser attributes associated with the browser print; and
calculating a checksum from the baseline browser attributes associated with the browser print;
wherein the calculated timestamp and checksum are calculated on the server side and compared against corresponding data, received with the login request, ostensibly calculated from the same baseline browser attributes captured on a client side at a time when the user initiated the login request.

10. The method of claim 9, wherein the checksum is calculated based on at least one time-varying attribute of the baseline browser attributes.

11. A computer-implemented method of improved login security, the method comprising:
processing, by at least one processor, a login request, including capturing user credentials and browser print information associated with the login request, the browser print information comprising current login attributes and an attributes checksum, wherein the attributes checksum is computed based on a set of one or more alphanumeric strings of data that are derived from baseline data of the browser print information;

validating, by the at least one processor, the login request, including analyzing one or both of the current login attributes and the attributes checksum derived based on at least one time-varying value associated with the browser print information captured during the login request, wherein the analyzing comprises assessing the browser print information for spoofed browser attributes including:

determining whether a captured timestamp of the current login data is stale or missing;

determining whether the attributes checksum of the login request is invalid or missing; and flagging the login request as a potential replay attack when at least one of the captured timestamp is stale, and the captured timestamp is missing, the attributes checksum is invalid, and the attributes checksum is missing;

redirecting, by the at least one processor, an access attempt that is flagged as the potential replay attack to an enhanced security process, wherein the enhanced security process includes initiating second factor authentication; and allowing or denying, by the at least one processor, login to customer accounts or information associated with the user credentials based on the enhanced security process.

12. The method of claim 11 wherein the current login data comprises information regarding the login request including time information (timestamp), date information, browser information, network information, device information, and other information.

13. The method of claim 11 wherein the attributes checksum comprises a dynamic, time-varying checksum that is generated at a time the browser print is created, wherein the attributes checksum is computed as a function of the login attributes associated with the browser print created.

14. The method of claim 11 wherein the second-factor authentication comprises initiating communication to an entity or device associated with the login request, the second factor authentication requiring further proof of the user's identity prior to granting access.

15. The method of claim 11 further comprising:
executing a Javascript collector to capture the browser print information.

16. The method of claim 15 wherein the attributes checksum comprises a dynamic, time-varying checksum that is generated by the Javascript collector at a time the browser print is created, wherein the Javascript collector computes the attributes checksum as a function of the login attributes associated with the browser print created.

17. The method of claim 11 wherein the step of processing the login request further comprises calculating the attributes checksum using a time-varying hash of a timestamp captured with the current login attributes.

18. The method of claim 11 wherein the step of processing the login request further comprises calculating the attributes checksum using a hash generated from non-static data captured with the current login attributes.

19. The method of claim 11 wherein the processing/receiving the login request further comprises calculating the attributes checksum using baseline browser attributes derived from the browser print information by means of an algorithm, wherein the algorithm comprises:

calculating a timestamp from the baseline browser attributes associated with the browser print; and calculating a checksum from the baseline browser attributes associated with the browser print;

wherein the calculated timestamp and checksum are calculated on the server side and compared against corresponding data, received with the login request, ostensibly calculated from the same baseline browser attributes captured on a client side at a time when the user initiated the login request.

20. The method of claim 19 wherein the checksum is calculated based on the at least one time-varying value that is contained within the baseline browser attributes.

* * * * *